(12) United States Patent
Nakagaki et al.

(10) Patent No.: US 11,885,398 B2
(45) Date of Patent: Jan. 30, 2024

(54) POWER TRANSMISSION DEVICE FOR VEHICLE

(71) Applicant: Hitachi Construction Machinery Co., Ltd., Tokyo (JP)

(72) Inventors: Makoto Nakagaki, Tsuchiura (JP); Takuma Koinuma, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 17/911,171

(22) PCT Filed: Sep. 1, 2021

(86) PCT No.: PCT/JP2021/032117
§ 371 (c)(1),
(2) Date: Sep. 13, 2022

(87) PCT Pub. No.: WO2022/070744
PCT Pub. Date: Apr. 7, 2022

(65) Prior Publication Data
US 2023/0349456 A1    Nov. 2, 2023

(30) Foreign Application Priority Data
Sep. 29, 2020  (JP) ................ 2020-163687

(51) Int. Cl.
*F16H 47/04*       (2006.01)
*F16H 61/4069*     (2010.01)
*F16H 59/68*       (2006.01)

(52) U.S. Cl.
CPC ......... *F16H 47/04* (2013.01); *F16H 61/4069* (2013.01); *F16H 2059/683* (2013.01); *F16H 2059/6861* (2013.01)

(58) Field of Classification Search
CPC ............... F16H 47/04; F16H 61/4069; F16H 2059/683; F16H 2059/6861
See application file for complete search history.

(56) References Cited

U.S. PATENT DOCUMENTS 5,569,109  A  * 10/1996  Okada .............. B62D 11/183
                                                         475/28
2009/0105028 A1* 4/2009  Hiraki ................ B60L 1/003
                                                         475/78
2021/0356024 A1* 11/2021 Zhu ..................... F16H 47/04

FOREIGN PATENT DOCUMENTS

| JP | 2005-76788 A | 3/2005 |
| JP | 2010-540866 A | 12/2010 |
| JP | 2017-74910 A | 4/2017 |

OTHER PUBLICATIONS

International Search Report (PCT/ISA/210) issued in PCT Application No. PCT/JP2021/032114 dated Nov. 2, 2021 with English translation (five (5) pages).

(Continued)

*Primary Examiner* — Edwin A Young
(74) *Attorney, Agent, or Firm* — Crowell & Moring LLP

(57) ABSTRACT

A transmission (21) as a power transmission device for a vehicle comprises an input shaft (22), an output shaft (23), a planetary continuously variable transmission mechanism (31), a direct connecting mechanism (27), and an idler gear (29). The direct connecting mechanism (27) comprises a direct connecting clutch (30). The planetary continuously variable transmission mechanism (31) comprises a planetary gear mechanism (32), a pump side clutch (33), a hydraulic pump (36), a hydraulic motor (38), and a motor side clutch (40). The hydraulic pump (36) and the hydraulic motor (38) are connected via a pair of main lines (37A, 37B). An electromagnetic on-off valve (41) capable of switching between a communicating state and a blocking state between (Continued)

the pair of main lines (37A, 37B) is provided between the pair of main lines (37A, 37B).

11 Claims, 13 Drawing Sheets

(56) References Cited

OTHER PUBLICATIONS

Japanese-language Written Opinion (PCT/ISA/237) issued in PCT Application No. PCT/JP2021/032114 dated Nov. 2, 2021 (three (3) pages).

* cited by examiner

POWER TRANSMISSION DEVICE FOR VEHICLE

TECHNICAL FIELD

The present invention relates to a power transmission device for a vehicle mounted on a wheel loader, for example, and capable of acquiring the optimum travel speed and drive force for various states of work.

BACKGROUND ART

Wheel loaders are operated in repeated patterns of a "V cycle" pattern primarily for loading burdens onto a dump truck and a "load & carry" pattern primarily for supplying burdens to a hopper. The "V cycle" pattern represents a movement for loading a dump truck with earth and sand excavated. The "load & carry" pattern represents a movement for transporting earth and sand excavated (load traveling), discharging into the hopper and forwarding (non-load traveling) the same. A wheel loader, in various operations including excavation, transportation, loading and forwarding, frequently switches between transmission mechanisms to acquire the optimum travel speed and drive force.

Representative drive systems of wheel loaders are roughly classified into 3 types: "transmission with torque converter", "hydrostatic continuously variable transmission (HST)" and "hydraulic mechanical continuously variable transmission (HMT)". Illustrative examples of a vehicle provided with a torque converter (hereafter also referred to as "torque converter vehicle") include lockup-type torque converter vehicles capable of mechanical connection to achieve a high efficiency.

In operation, a torque converter vehicle allows in a low-speed range the torque converter to achieve torque amplification, which is advantageous when large torques are required for starting a vehicle body or excavating earth and sand. Unfortunately, the torque amplification causes the torque converter to slide and leads to reduced operational efficiencies. Specifically, while the operational efficiency increases with rises in the speed ratio, the efficiency reaches the maximum at a certain speed ratio and will subsequently be reduced. Thus, such a torque converter vehicle operated in a high-speed range tends to lower the efficiency. Nevertheless, a torque converter vehicle is configured to mechanically connect an engine's output shaft and a transmission's output shaft by means of a lockup mechanism to allow the power transmission efficiency to increase.

In vehicles with a hydrostatic continuously variable transmission, a hydraulic pump and/or a hydraulic motor in a hydrostatic continuously variable transmission are of variable displacement type. A vehicle with a hydrostatic continuously variable transmission changes its volume by controlling tilting of a variable displacement hydraulic pump or a hydraulic motor to control the vehicle speed and the tractive force. The efficiency is calculated from the product of the mechanical efficiency and the volume efficiency of a hydrostatic continuously variable transmission. The vehicle with a hydrostatic continuously variable transmission can be operated with a high efficiency of approximately 70 to 80% in a high-speed range, and a higher efficiency in a low-speed range can be provided than a torque converter.

Hydraulic mechanical continuously variable transmissions are configured to include a hydraulic power transmission mechanism operated by a hydraulic unit of a hydrostatic continuously variable transmission and a gear-driven mechanical power transmission mechanism (Patent Document 1). The input power from an engine to a hydraulic mechanical continuously variable transmission is divided and fed for hydraulic power transmission and mechanical power transmission, and the divided powers are subsequently connected and outputted. It is a planetary gear mechanism that contributes to dividing and connecting the power. The planetary gear mechanism in a vehicle with a hydraulic mechanical continuously variable transmission increases the ratio of the mechanical power transmission with a high transmission efficiency to the hydraulic power transmission with a low transmission efficiency as the vehicle speed rises. This configuration in the vehicle with a hydraulic mechanical continuously variable transmission can overcome a low efficiency of a torque converter vehicle in a low-speed range due to a slide as its drawback, and achieve a higher transmission efficiency in a high-speed range than the vehicle with a hydrostatic continuously variable transmission. In addition, the vehicle with a hydraulic mechanical continuously variable transmission can control the vehicle speed and the tractive force by changing the volume by tilting control of the hydraulic power transmission mechanism. Therefore, the vehicle with a hydraulic mechanical continuously variable transmission can control the distribution of input power by an engine between a cargo handling machine and a drive system.

PRIOR ART DOCUMENT

Patent Document

Patent Document 1: Japanese Patent Laid-Open No. 2010-540866 A (Patent Publication No. 5190513)

SUMMARY OF THE INVENTION

A vehicle with a hydraulic mechanical continuously variable transmission can achieve a high efficiency by continuously variable transmission when burdens are transported in a low-speed (5 to 10 km/h). However, the vehicle with a hydraulic mechanical continuously variable transmission hydraulically distributes the power even during transport at a high speed (10 to 20 km/h), which can reduce the transmission efficiency unlike the torque converter vehicle provided with a lockup mechanism. Likewise, the vehicle with a hydraulic mechanical continuously variable transmission hydraulically distributes the power during a forwarding operation at a speed (10 to 40 km/h), which can reduce the transmission efficiency unlike the torque converter vehicle provided with a lockup mechanism. For example, during an operation at a speed of 0 to 5 km/h, the difference in the efficiency between the vehicle with a hydraulic mechanical continuously variable transmission and the torque converter vehicle is nearly 0. On the other hand, during an operation at a speed of 5 to 10 km/h, the vehicle with a hydraulic mechanical continuously variable transmission provides a higher efficiency than the torque converter vehicle. Meanwhile, during an operation at a speed of 10 to 40 km/h, a torque converter vehicle provided with a lockup mechanism provides a higher efficiency than the vehicle with a hydraulic mechanical continuously variable transmission.

Therefore, to achieve higher efficiency power transmission, a transmission can be proposed such that during low-speed traveling and excavating and loading operations, a hydraulic mechanical continuously variable transmission transmits the power using hydraulic pressure with a high transmission efficiency for low-speed traveling operations and high operability, and during high-speed forwarding and transporting operations the power transmission is switched to a direct connecting mechanism with a high transmission efficiency for high-speed traveling operations. Specifically, a proposed power transmission device for a vehicle comprises: an input shaft rotated by a prime mover mounted on a vehicle, an output shaft outputting rotation to a traveling device of the vehicle, a planetary continuously variable transmission mechanism disposed between the input shaft and the output shaft, and changing speed of the rotation on the input shaft side and transmitting power to the output shaft side, a direct connecting mechanism transmitting the rotation on the input shaft side to the output shaft side by bypassing the planetary continuously variable transmission mechanism, and an idler element mechanically connecting an output gear side of the planetary continuously variable transmission mechanism and an output shaft side of the direct connecting mechanism, wherein the direct connecting mechanism comprises: an input side gear connected to the input shaft, an output side gear meshing with the input side gear; and a first clutch disposed between the output side gear and the idler element, and the planetary continuously variable transmission mechanism comprises: a planetary gear mechanism connected to the input shaft side, a second clutch disposed on the output shaft side of the planetary gear mechanism, a hydraulic pump connected to an output side of the planetary gear mechanism via the second clutch, a hydraulic motor connected to the hydraulic pump via a pair of main lines, and a third clutch disposed between the hydraulic motor and the idler element or the output shaft.

In this configuration, the second clutch and the third clutch may each be a synchromesh mechanism clutch. That is, friction plate clutches and synchromesh mechanism clutches can be illustrated. A synchromesh mechanism clutch is a meshing clutch having synchronization performance. A friction plate clutch is excellent in synchronization performance. However, increases in the transmission torque of a friction plate clutch require use of large-diameter friction plates or more friction plates. The resultant larger power transmission device can limit the space for mounting itself on a working vehicle. Moreover, in the friction plate clutch, the area of a sliding portion can unfortunately be larger, and the frictional surface (sliding surface) of a friction plate can generate more heat when the clutch is released. An approach of reducing heat generation from a friction plate clutch may be to cool a friction plate clutch in a liquid. Nevertheless, this approach can cause more heat loss due to the agitation of the liquid on the frictional surface and due to the discharge of the liquid to the outside in the rotational direction from centrifugal forces by the rotation of the friction plate.

On the other hand, the synchromesh mechanism clutch can reduce heat generation by friction (sliding) on a small frictional sliding surface when the clutch is released. The synchromesh mechanism clutch can advantageously reduce the amount of a cooling liquid and heat loss. Therefore, a synchromesh mechanism clutch can be adopted to reduce heat loss. Unfortunately, in a planetary continuously variable transmission mechanism provided with a synchromesh mechanism clutch, it is difficult to stably connect and release the clutch without cutting off power transmission by hydraulic power in a hydraulic circuit of the planetary continuously variable transmission mechanism in a short period of time to be in a non-load state.

An object of the present invention is to provide a power transmission device for a vehicle capable of stably connecting and releasing a clutch by cutting off power transmission by hydraulic power in a hydraulic circuit of a planetary continuously variable transmission mechanism in a short period of time.

The present invention provides a power transmission device for a vehicle, comprising: an input shaft rotated by a prime mover mounted on a vehicle, an output shaft outputting rotation to a traveling device of the vehicle, a planetary continuously variable transmission mechanism disposed between the input shaft and the output shaft, and changing speed of the rotation on the input shaft side and transmitting power to the output shaft side, a direct connecting mechanism transmitting the rotation on the input shaft side to the output shaft side by bypassing the planetary continuously variable transmission mechanism, and an idler element mechanically connecting an output side of the planetary continuously variable transmission mechanism and an output side of the direct connecting mechanism, wherein the direct connecting mechanism comprises a first clutch disposed between the input shaft and the idler element, and the planetary continuously variable transmission mechanism comprises: a planetary gear mechanism connected to the input shaft side, a second clutch disposed on the output side of the planetary gear mechanism, a hydraulic pump connected to the output side of the planetary gear mechanism via the second clutch, a hydraulic motor connected to the hydraulic pump via a pair of main lines, a third clutch disposed between the hydraulic motor and the idler element or the output shaft, and a communication valve capable of switching between a communicating state and a blocking state between the pair of main lines.

According to the present invention, the power transmission device that can stably connect and release a clutch by cutting off power transmission by hydraulic power in a hydraulic circuit of a planetary continuously variable transmission mechanism in a short period of time.

BRIEF DESCRIPTION OF THE DRAWINGS

FIG. 4 is a block diagram showing the controller in FIG. 3 together with a communication valve (electromagnetic on-off valve) and the like.

MODE FOR CARRYING OUT THE INVENTION

Figure 5:
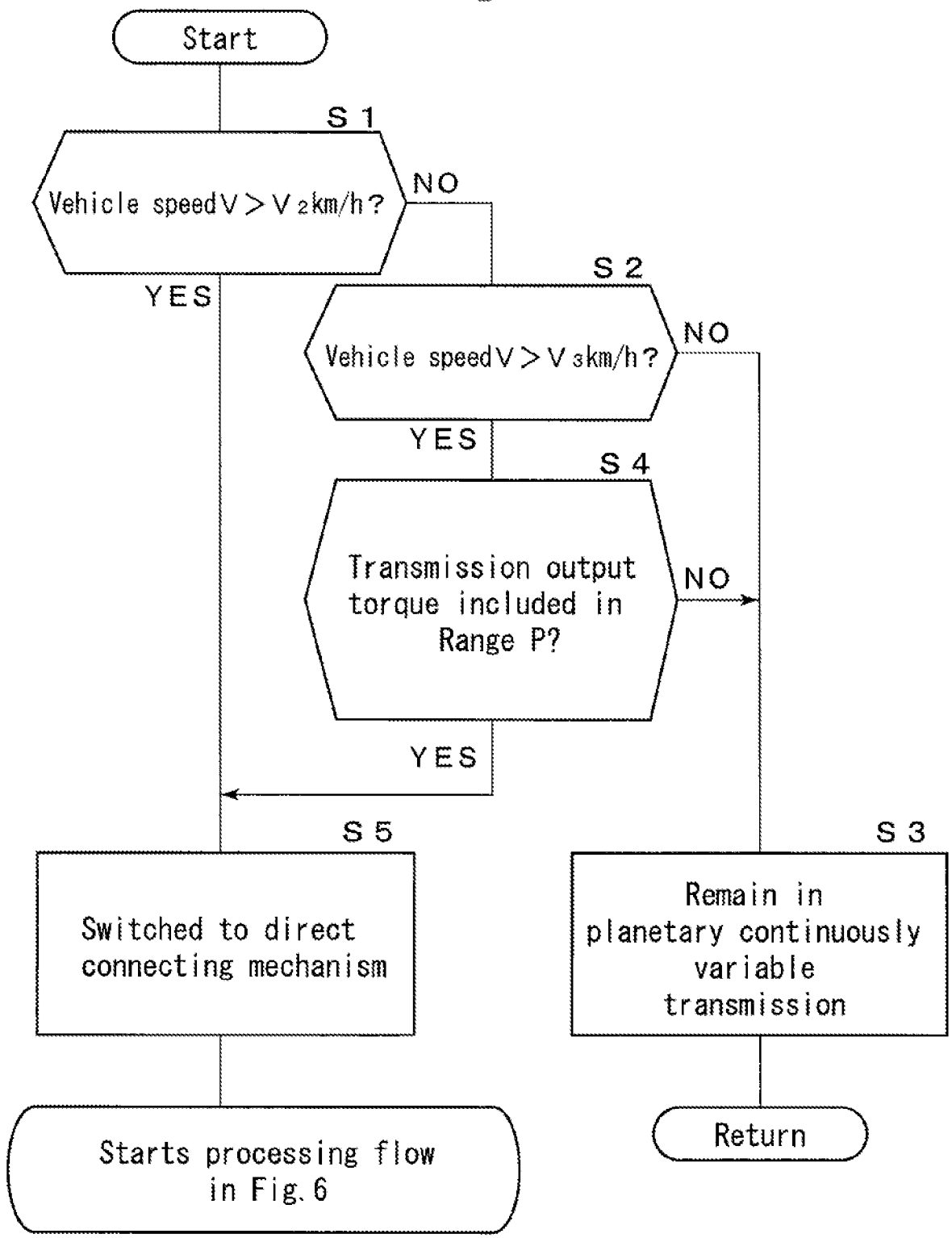
FIG. 5 is a flow chart showing a process by the controller when the power is switched from a planetary continuously variable transmission mechanism to a direct connecting mechanism.
Figure 6:
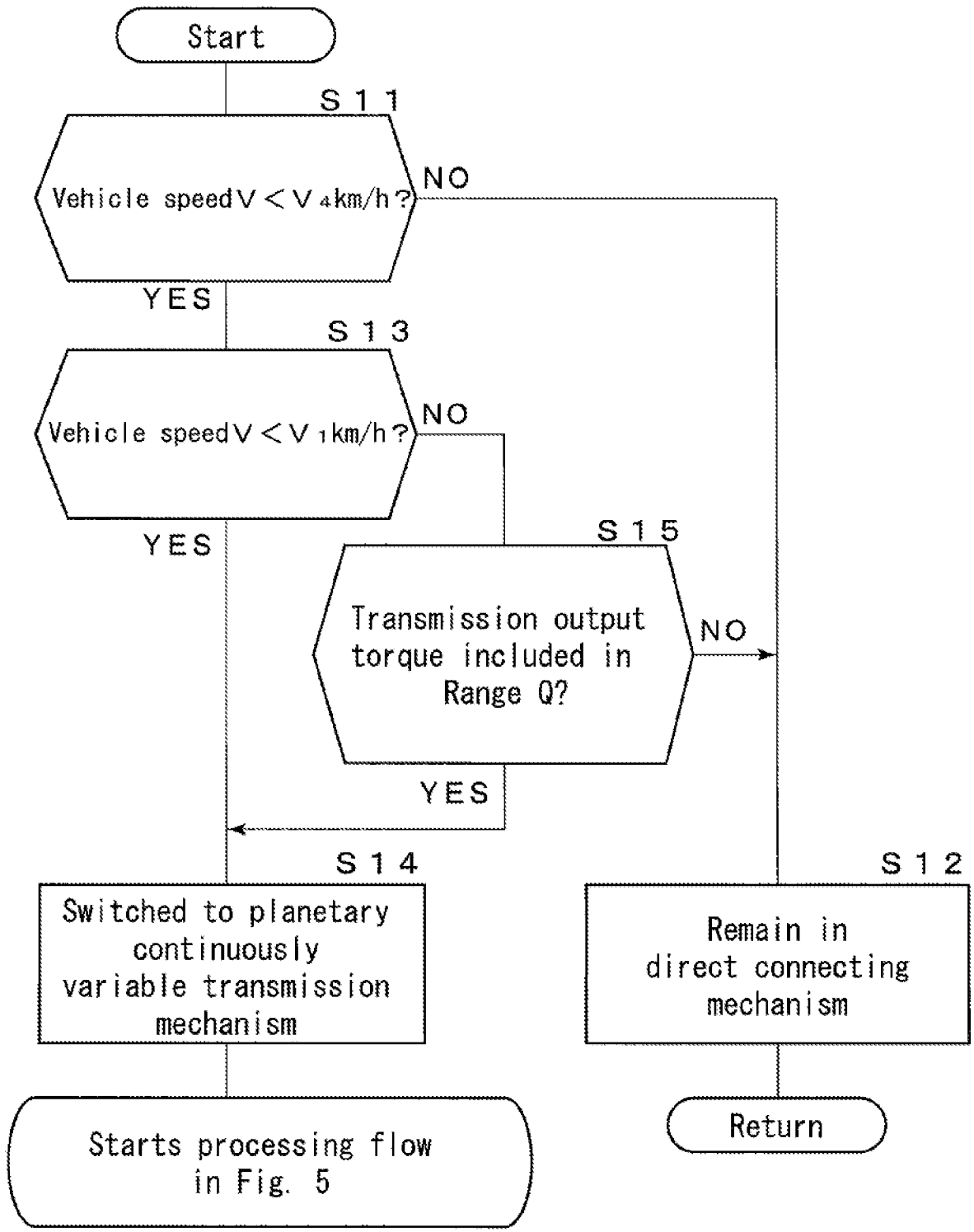
FIG. 6 is a flow chart showing the process by the controller when the power is switched from the direct connecting mechanism to the planetary continuously variable transmission mechanism.

Hereinafter, a power transmission device for a vehicle according to each of embodiments in the present invention will be in detail explained with references to the accompanying drawings, by taking a case of being applied to a wheel loader as an example. Each step in flow charts shown in FIGS. 5 and 6 is indicated as notation "S" (for example, step 1 is indicated as "S1").

Figure 1:
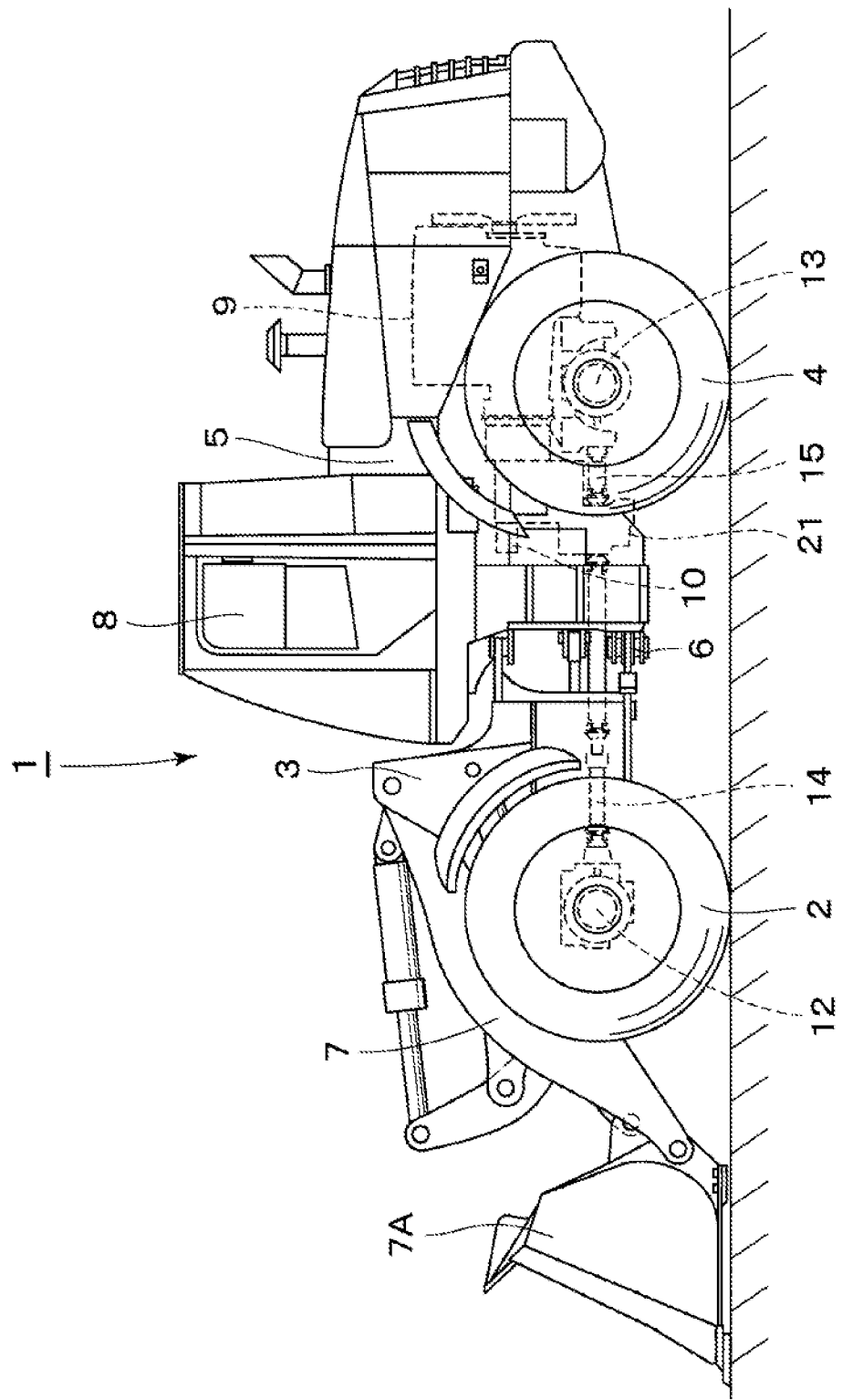
FIG. 1 is a left side view showing a wheel loader on which a power transmission device for a vehicle is mounted according to an embodiment.

FIGS. 1 to 9 show a power transmission device for a vehicle according to embodiments of the present invention. In FIG. 1, a wheel loader 1 is representative example of a vehicle (working vehicle). The wheel loader 1 is configured as an articulate-type working vehicle in which a front vehicle body 3 provided with left and right front wheels 2 is connected to a rear vehicle body 5 provided with left and right rear wheels 4 to be capable of bending in the left-and-right direction. That is, the front vehicle body 3 and the rear vehicle body 5 configures a vehicle body of the wheel loader 1. A center hinge 6 and a steering cylinder (not shown) are arranged between the front vehicle body 3 and the rear vehicle body 5. The front vehicle body 3 and the rear vehicle body 5 bend in the left-and-right direction, with the center hinge 6 positioned centrally by extending and contracting the steering cylinder. This allows to perform the steering of the wheel loader at the traveling.

A working mechanism 7 called also a cargo handling machine is disposed in the front vehicle body 3 of the wheel loader 1 to be capable of tilting/lifting thereto. The working mechanism 7 comprises a loader bucket 7A. On the other hand, a cab 8 that defines therein an operating room, an engine 9, a hydraulic pump 10, a transmission 21 as a speed-changing device and the like are arranged in the rear vehicle body 5 of the wheel loader 1. The engine 9 is a power source (prime mover) for the wheel loader 1. The power source (prime mover) can be configured with one unit of the engine 9 as an internal combustion engine, besides may be configured with, for example, an engine and an electric motor or an electric motor unit. The hydraulic pump 10 is connected to the engine 9. The hydraulic pump 10 is a hydraulic power source for operating the working mechanism 7.

A front axle 12 extending in the left-and-right direction is disposed under the front vehicle body 3. The left and right front wheels 2 are attached in both ends of the front axle 12. On the other hand, a rear axle 13 extending in the left-and-right direction is disposed under the rear vehicle body 5. The left and right rear wheels 4 are attached on both ends of the rear axle 13.

The front axle 12 is connected to the transmission 21 via a front propeller shaft 14. The rear axle 13 is connected to the transmission 21 via a rear propeller shaft 15. The transmission 21 decelerates the rotation of the engine 9 to be transmitted to the front propeller shaft 14 and the rear propeller shaft 15. That is, the power from the engine 9 is transmitted to the transmission 21 connected to the engine 9.

Figure 2:
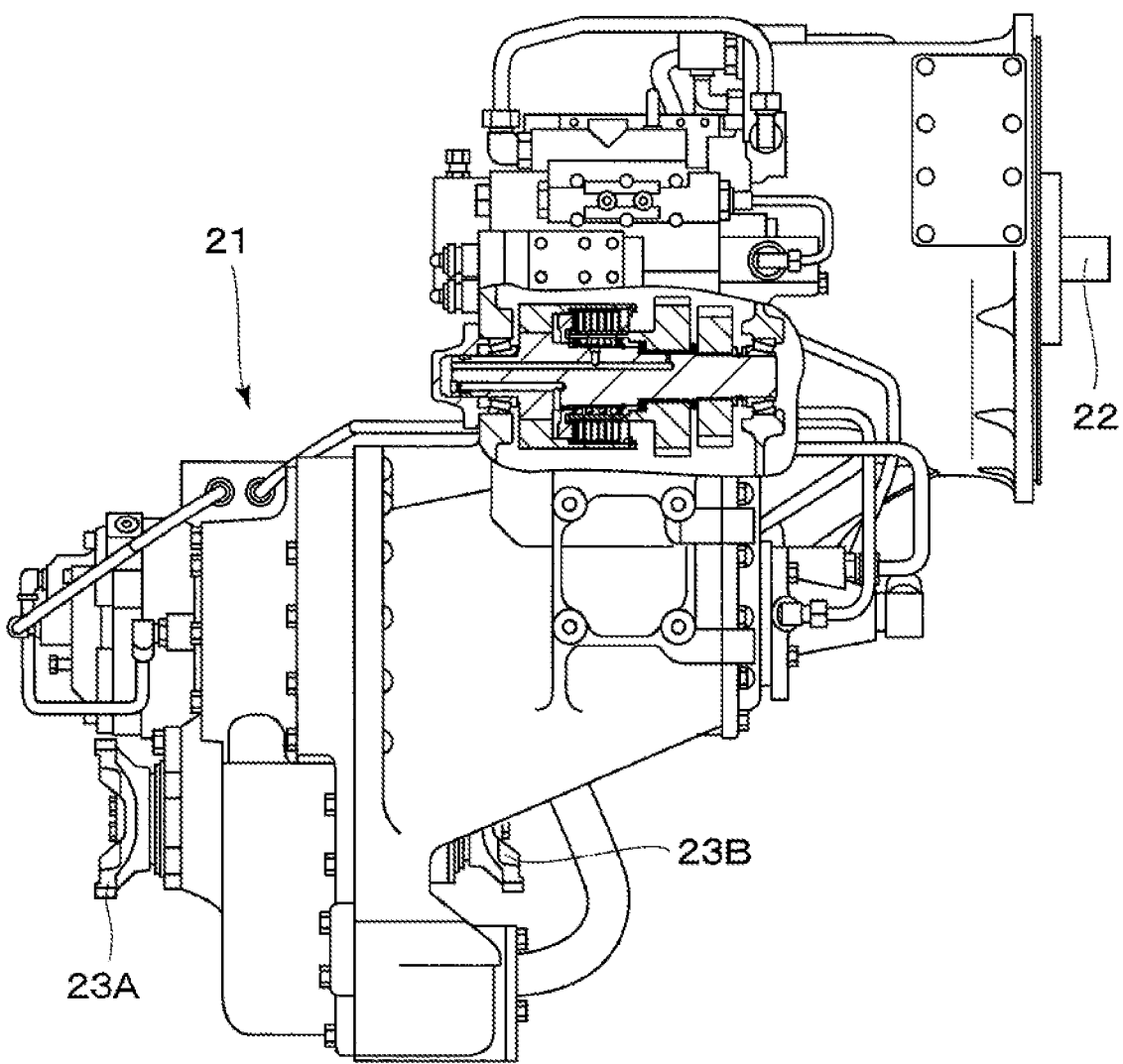
FIG. 2 is a partially broken side view showing a transmission (power transmission device for a vehicle) in FIG. 1.

The power from the engine 9 is transmitted from front and rear output shafts 23A, 23B of the transmission 21 to the front axle 12 and the rear axle 13 via the front propeller shaft 14 and the rear propeller shaft 15 after the transmission 21 controls the rotational speed and the rotating direction. That is, as shown in FIG. 2, the transmission 21 comprises an input shaft 22 connected to the engine 9, a front side output shaft 23A connected to the front propeller shaft 14, and a rear side output shaft 23B connected to the rear propeller shaft 15. The transmission 21 performs the switching of forward rotation and reverse rotation between the input shaft 22 and the output shafts 23A, 23B by switching a power transmission path in the transmission.

Figure 3:
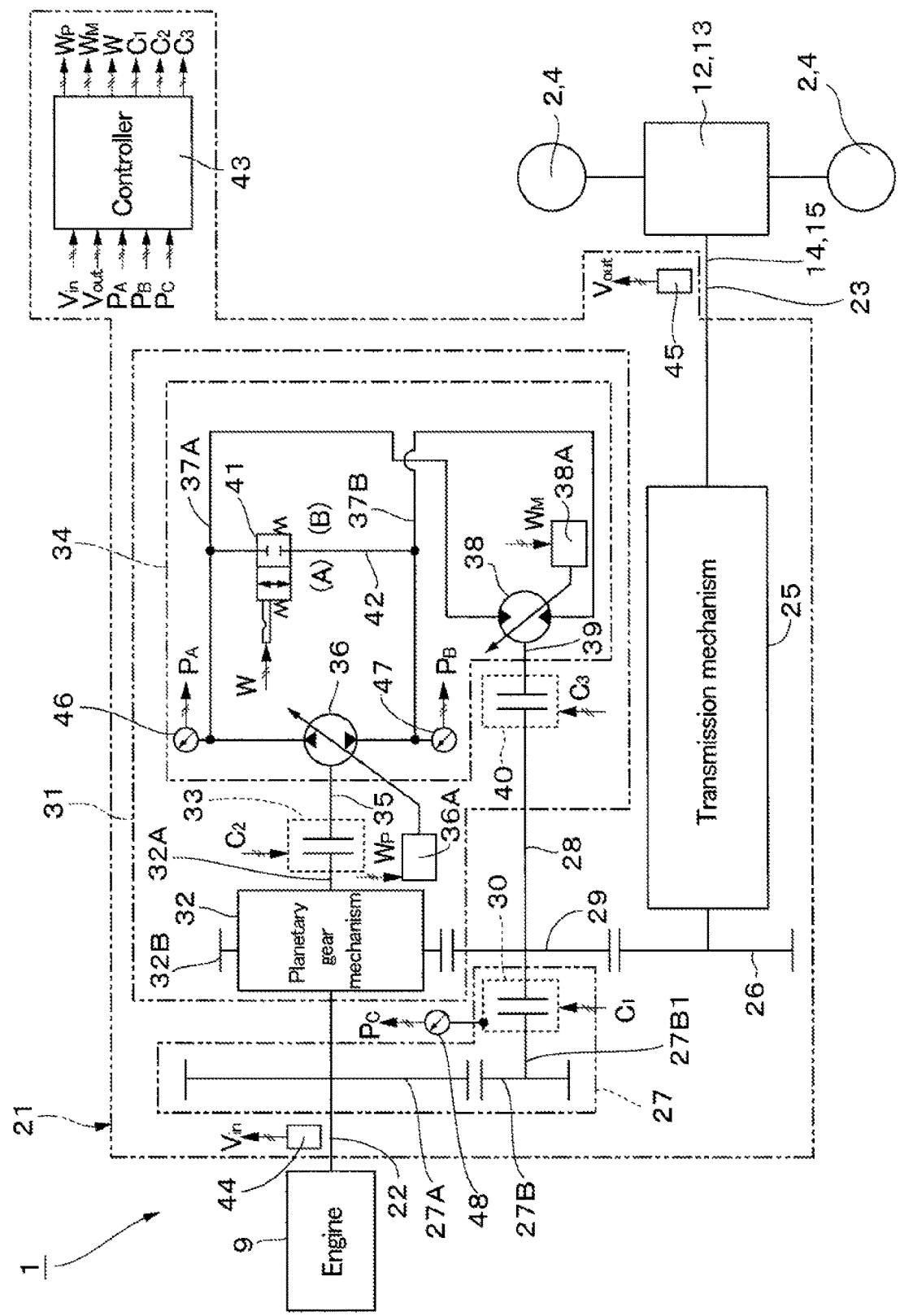
FIG. 3 is a configuration diagram showing a power transmission paths of the wheel loader together with a controller.

Next, an explanation will be made of the transmission 21 according to an embodiment by referring to FIGS. 3 to 9, in addition to FIGS. 1 and 2. FIG. 3 schematically shows the output shaft 23 of the transmission 21 as a common output shaft 23 (=output shafts 23A, 23B) transmitting the power to both the front axle 12 and the rear axle 13 to avoid complexity of graphic configuration. That is, in FIG. 3, a configuration of dividing the power between the front side output shaft 23A and the rear side output shaft 23B via a center differential mechanism and the like, for example, is omitted.

The transmission 21 as a power transmission device for a vehicle comprises an input shaft 22, an output shaft 23, a planetary continuously variable transmission mechanism 31, a transmission mechanism 25 as a stepped transmission mechanism, a direct connecting mechanism 27, a transmission shaft 28, and an idler gear 29 as an idler element. Moreover, the transmission 21 comprises a controller 43, a first pressure detector 46, a second pressure detector 47, a third pressure detector 48, a first speed detector 44, and a second speed detector 45.

The input shaft 22 is rotated by the engine 9, which is a prime mover mounted on a vehicle. That is, (a drive shaft of) the engine 9 is connected to the input shaft 22. On the other hand, the output shaft 23 outputs the rotation to the front axle 12 and/or the rear axle 13, which are traveling devices of the vehicle. That is, the power of the engine 9 is outputted from the output shaft 23 via the transmission 21 as a speed-changing device. The output shaft 23 outputs the rotation to the front wheel 2 and/or the rear wheel 4 via the front axle 12 and/or the rear axle 13 of the wheel loader 1.

The input power from the input shaft 22 to the transmission 21 is transmitted to the idler gear 29 via the planetary continuously variable transmission mechanism 31 or the direct connecting mechanism 27. The power transmitted to the idler gear 29 is outputted from the output shaft 23 through the transmission mechanism 25. The planetary continuously variable transmission mechanism 31 is disposed between the input shaft 22 and the output shaft 23. The planetary continuously variable transmission mechanism 31 changes the speed of a rotation on the input shaft 22-side and transmits the power to the output shaft 23-side. An input side of the planetary continuously variable transmission mechanism 31 is connected to the input shaft 22 provided with the input side gear 27A of the direct connecting mechanism 27. An output side of the planetary continuously variable transmission mechanism 31 is connected to the transmission shaft 28 provided with the idler gear 29.

The transmission mechanism 25 is disposed between the input shaft 22 and the output shaft 23 in series with the planetary continuously variable transmission mechanism 31 and the direct connecting mechanism 27. The transmission mechanism 25 also changes the speed of a rotation on the input shaft 22-side and transmits the power to the output shaft 23-side. In this case, the transmission mechanism 25 is disposed between an intermediate gear 26 meshing with the idler gear 29 and the output shaft 23. That is, an input side of the transmission mechanism 25 is connected to the intermediate gear 26. An output side of the transmission mechanism 25 is connected to the output shaft 23. The transmission mechanism 25 is configured as a step-shifting transmission mechanism, for example. The transmission mechanism 25 is configured to comprise a plurality of transmission shafts, a plurality of gears, and a plurality of clutches, for example. In this case, the transmission mechanism 25 can be configured as a transmission mechanism (DCT: Dual Clutch Transmission) including, for example, a forward clutch (not shown) to be connected when the wheel loader 1 is advanced and a reverse clutch (not shown) to be connected when the wheel loader 1 is retreated. Such a transmission mechanism 25 may be omitted. That is, the intermediate gear 26 and the output shaft 23 may directly be connected not via the transmission mechanism 25.

The direct connecting mechanism 27 transmits a rotation on the input shaft 22-side to the output shaft 23-side by bypassing the planetary continuously variable transmission mechanism 31. That is, the direct connection mechanism 27 directly transmits the rotation of the input shaft 22 to the transmission mechanism 25 not via the planetary continuously variable transmission mechanism 31. The direct connecting mechanism 27 comprises an input side gear 27A connected to the input shaft 22, an output side gear 27B meshing with the input side gear 27A, a rotational shaft 27B1 disposed coaxially with the transmission shaft 28, and a direct connecting clutch 30 as a first clutch. The rotation of the output side gear 27B is transmitted to the transmission shaft 28 via the direct connecting clutch 30. In an embodiment, the input side gear 27A is disposed on the input shaft 22. The output side gear 27B is disposed on the rotational shaft 27B1 disposed coaxially with the transmission shaft 28. The direct connecting clutch 30 is disposed between the rotational shaft 27B1 and the transmission shaft 28.

The transmission shaft 28 corresponds to an output shaft of the direct connecting mechanism 27 and an output shaft of the planetary continuously variable transmission mechanism 31. In this case, the transmission shaft 28 is disposed coaxially with the rotational shaft 27B1 of the direct connecting mechanism 27 and a motor shaft 39 of the planetary continuously variable transmission mechanism 31. The transmission shaft 28 is connected to the rotational shaft 27B1 of the direct connecting mechanism 27 via the direct connecting clutch 30. In a case where the direct connecting clutch 30 is connected, the rotation of the output side gear 27B of the direct connecting mechanism is transmitted to the transmission shaft 28. The transmission shaft 28 is connected to the hydraulic motor 38 of the planetary continuously variable transmission mechanism 31 via the motor side clutch 40. In a case where the motor side clutch 40 is connected, the rotation of the hydraulic motor 38 of the planetary continuously variable transmission mechanism 31 is transmitted to the transmission shaft 28. Moreover, the transmission shaft 28 is connected to the planetary output gear 32B of the planetary continuously variable transmission mechanism 31 via the idler gear 29.

The idler gear 29 as an idler element is disposed on the transmission shaft 28. The idler gear 29 mechanically connects the output side of the planetary continuously variable transmission mechanism 31 and the output side of the direct connecting mechanism 27. The idler gear 29 meshes with the planetary output gear 32B of the planetary gear mechanism 32 which configures the planetary continuously variable transmission mechanism 31. The idler gear 29 meshes with the intermediate gear 26. The rotation of the idler gear 29 is transmitted to the transmission mechanism 25 via the intermediate gear 26. That is, the input power from the input shaft 22 of the transmission 21 is transmitted to the idler gear 29 via the planetary continuously variable transmission mechanism 31 or the direct connecting mechanism 27. The power transmitted to the idler gear 29 is outputted from the output shaft 23 via the transmission mechanism 25.

The direct connecting clutch 30 is provided within the direct connecting mechanism 27 that is disposed between the input shaft 22 and the idler gear 29. That is, the direct connecting clutch 30 is disposed between the rotational shaft 27B1 of the output side gear 27B within the direct connecting mechanism 27 and the transmission shaft 28 provided with the idler gear 29. The direct connecting clutch 30 is capable of switching between a "connecting state (fastening state)" where the transmission of a rotation (torque, rotational force, power) is performed between the direct connecting mechanism 27 (rotational shaft 27B1) and the idler gear 29 (transmission shaft 28) and a "blocking state (releasing state)" where the transmission of the rotation is cut off. In a case where the direct connecting clutch 30 is in the connecting state, the rotation of the output side gear 27B (rotational shaft 27B1) of the direct connecting mechanism 27 is transmitted to the idler gear 29 via the transmission shaft 28. In a case where the direct connecting clutch 30 is in the releasing state, the rotation of the output side gear 27B (rotational shaft 27B1) is not transmitted to the transmission shaft 28. The connection and release of the direct connecting clutch 30 are controlled based upon a command from the controller 43 (command signal $C_1$).

Next, an explanation will be made of the planetary continuously variable transmission mechanism 31.

The planetary continuously variable transmission mechanism 31 comprises the planetary gear mechanism 32, a pump side clutch 33 as a second clutch, a hydrostatic continuously variable transmission mechanism 34, and the motor side clutch 40 as a third clutch. The hydrostatic continuously variable transmission mechanism 34 comprises a pump shaft 35, a hydraulic pump 36, a pair of main lines 37A, 37B, the hydraulic motor 38, the motor shaft 39, an electromagnetic on-off valve 41, and a connecting line 42.

The planetary gear mechanism 32 is connected to the input shaft 22-side. Specifically, the planetary gear mechanism 32 is connected to the input shaft 22. The planetary gear mechanism 32 is configured by one unit or step-shifting planetary gear device (not shown), a planetary output shaft 32A, and a planetary output gear 32B. The planetary gear device comprises a sun gear, a ring gear, and a carrier supporting a planetary gear meshing with the sun gear and the ring gear, for example. For example, the input shaft 22 is connected to any member(s) of the sun gear, the ring gear and the carrier. The planetary output shaft 32A is connected to any member(s) of the sun gear, the ring gear and the carrier to which the input shaft 22 is not connected. The planetary output gear 32B is connected to the remaining member(s) of the sun gear, the ring gear and the carrier. The planetary output shaft 32A is connected to the pump shaft 35 of the hydrostatic continuously variable transmission mechanism 34 (hydraulic pump 36) via the pump side clutch 33. The rotation of the planetary output shaft 32A is transmitted to the pump shaft 35 of the hydrostatic continuously variable transmission mechanism 34 (hydraulic pump 36) via the pump side clutch 33. The planetary output gear 32B meshes with the idler gear 29. The rotation of the planetary output gear 32B is transmitted to the idler gear 29.

The pump side clutch 33 is disposed on the output side of the planetary gear mechanism 32. That is, the pump side clutch 33 is disposed between the planetary output shaft 32A of the planetary gear mechanism 32 and the pump shaft 35 (hydraulic pump 36) of the hydrostatic continuously variable transmission mechanism 34. The pump side clutch 33 is capable of switching between a "connecting state (fastening state)" where the transmission of a rotation is performed between the planetary gear mechanism 32 (planetary output shaft 32A) and the hydraulic pump 36 (pump shaft 35) of the hydrostatic continuously variable transmission mechanism 34 and a "blocking state (releasing state)" where the transmission of the rotation is cut off. The rotation of the planetary output shaft 32A of the planetary gear mechanism 32 is transmitted to the hydraulic pump 36 via the pump shaft 35 of the hydrostatic continuously variable transmission mechanism 34 when the pump side clutch 33 is in the connecting state. The rotation of the planetary output shaft 32A is not transmitted to the pump shaft 35 when the pump side clutch 33 is in the releasing state. The connection and release of the pump side clutch 33 are controlled based upon a command from the controller 43 (command signal $C_2$).

The pump shaft 35 of the hydrostatic continuously variable transmission mechanism 34 corresponds to an input shaft of the hydrostatic continuously variable transmission mechanism 34. The pump shaft 35 is connected to a rotational shaft (input shaft) of the hydraulic pump 36. Alternatively, the pump shaft 35 corresponds to the rotational shaft (input shaft) of the hydraulic pump 36. The hydraulic pump 36 is connected to the output side of the planetary gear mechanism 32, or the planetary output shaft 32A of the planetary gear mechanism 32 via the pump side clutch 33. The hydraulic pump 36 circulates pressurized oil in the pair of main lines 37A, 37B by rotatively driving the pump shaft 35. The hydraulic pump 36 is configured by a variable displacement swash plate type of a hydraulic pump, for example. The hydraulic pump 36 includes a regulator 36A controlling the pump capacity. The regulator 36A of the hydraulic pump 36 is variably controlled based upon a command from the controller 43 (command signal $W_P$). The pair of main lines 37A, 37B connect a pair of supply and discharge ports of the hydraulic pump 36 and a pair of supply and discharge ports of the hydraulic motor 38.

The hydraulic motor 38 is connected to the hydraulic pump 36 via the pair of main lines 37A, 37B. The hydraulic motor 38 is rotated by pressurized oil fed from the hydraulic pump 36. The hydraulic motor 38 is configured by a variable displacement swash plate type of a hydraulic motor, for example. The hydraulic motor 38 includes a regulator 38A controlling the motor capacity. The regulator 38A of the hydraulic motor 38 is variably controlled based upon a command from the controller 43 (command signal $W_M$). The motor shaft 39 of the hydrostatic continuously variable transmission mechanism 34 corresponds to an output shaft of the hydrostatic continuously variable transmission mechanism 34. The motor shaft 39 is connected to a rotational shaft (output shaft) of the hydraulic motor 38. Alternatively, the motor shaft 39 corresponds to the rotational shaft (output shaft) of the hydraulic motor 38.

The motor side clutch 40 is disposed between the hydraulic motor 38 and the idler gear 29. As a result, the hydraulic motor 38 is connected to the idler gear 29 via the motor side clutch 40. That is, the motor side clutch 40 is disposed between the motor shaft 39 of the hydrostatic continuously variable transmission mechanism 34 and the transmission shaft 28 provided with the idler gear 29. The motor side clutch 40 is capable of switching between a "connecting state (fastening state)" where the transmission of a rotation is performed between the idler gear 29 (transmission shaft 28) and the hydraulic motor 38 (motor shaft 39) of the hydrostatic continuously variable transmission mechanism 34 and a "blocking state (releasing state)" where the transmission of the rotation is cut off. The rotation of the motor shaft 39 of the hydrostatic continuously variable transmission mechanism 34 (=rotation of the hydraulic motor 38) is transmitted to the idler gear 29 via the transmission shaft 28 when the motor side clutch 40 is in the connecting state. The rotation of the motor shaft 39 is not transmitted to the transmission shaft 28 when the motor side clutch 40 is in the releasing state. The connection and release of the motor side clutch 40 are controlled based upon a command from the controller 43 (command signal $C_3$).

In an embodiment, the input power from the input shaft 22 of the transmission 21 can optionally be transmitted to the transmission mechanism 25 via the planetary continuously variable transmission mechanism 31, or transmitted to the transmission mechanism 25 via the direct connecting mechanism 27. As a result, if a planetary continuously variable transmission mechanism 31 is suitably operated, such a planetary continuously variable transmission mechanism 31 can be used. On the other hand, in a case where the direct connecting mechanism 27 suitably changes the speed, the power can be transmitted via the direct connecting mechanism 27.

The direct connecting clutch 30 is released to connect the pump side clutch 33 and the motor side clutch 40 in a case where the power is transmitted to the transmission mechanism 25 via the planetary continuously variable transmission mechanism 31. In this case, the power may be distributed to the transmission mechanism 25-side via the planetary gear mechanism 32 and the hydrostatic continuously variable transmission mechanism 34, or the power may be transmitted to the transmission mechanism 25-side without transmitting the power to the hydrostatic continuously variable transmission mechanism 34 by setting the rotational speed of the hydraulic pump 36 at 0.

The state of releasing the direct connecting clutch 30, connecting the pump side clutch 33 and the motor side clutch 40, transmitting the power to the hydrostatic continuously variable transmission mechanism 34 and transmitting the power to the transmission mechanism 25-side is referred to as "continuously variable transmission". The state of releasing the direct connecting clutch 30, connecting the pump side clutch 33 and the motor side clutch 40, transmitting no power to the hydrostatic continuously variable transmission mechanism 34 but transmitting the power to the transmission mechanism 25-side is referred to as "internal direct connection". During the internal direct connection, the tilting (discharged capacity) of the hydraulic pump 36 is increased above a predetermined value and the tilting of the hydraulic motor 38 is set in a neutral state to allow for braking in the hydrostatic continuously variable transmission mechanism 34 and setting the rotational speed of the hydraulic pump 36 at 0. As a result, the power from the engine 9 is transmitted to the transmission mechanism 25. In fact, the rotational speed of the hydraulic pump 36 never reaches 0 because the hydraulic pump 36 and the hydraulic motor 38 are leaking oil, but most of the power from the engine 9 can be distributed to the transmission mechanism 25. On the other hand, in a case where the power is transmitted to the transmission mechanism 25 via the direct connecting mechanism 27, the direct connecting clutch 30 is connected to release the pump side clutch 33 and the motor side clutch 40.

Herein, the direct connecting clutch 30, the pump side clutch 33 and the motor side clutch 40 may each be adopted to a wet multiple-disk clutch or a synchromesh mechanism clutch. The wet multiple-disk clutch presses friction plates to generate a transmission torque. The synchromesh mechanism clutch allows small gears on end surfaces of hubs fixed on the shaft to mesh with each other to transmit the torque. Therefore, the synchromesh mechanism clutch is smaller in size and larger in transmission torque capacity than the friction plate clutch. Moreover, with a small drag torque in the synchromesh mechanism clutch upon release of meshing, heat generation by dragging is smaller than in the wet multiple-disk clutch.

Therefore, in an embodiment, the pump side clutch 33 and the motor side clutch 40 are each an engagement clutch transmitting the rotation by meshing with a pawl portion, or a synchromesh mechanism clutch to reduce transmission torque loss. The direct connecting clutch 30 is a wet multiple-disk clutch. However, in a case where the pump side clutch 33 and the motor side clutch 40 are each a synchromesh mechanism clutch, it is difficult to connect and release the pump side clutch 33 and the motor side clutch 40 if the loads on the hydraulic pump 36 and the hydraulic motor 38 of the hydrostatic continuously variable transmission mechanism 34 are not reduced.

Therefore, in an embodiment, the hydrostatic continuously variable transmission mechanism 34 comprises an electromagnetic on-off valve 41 as a communication valve. That is, the pair of main lines 37A, 37B of the hydrostatic continuously variable transmission mechanism 34 are connected by the connecting line 42. Herein, the electromagnetic on-off valve 41 is provided on the way of the connecting line 42. As a result, the electromagnetic on-off valve 41 capable of switching between a communicating state and a blocking state between the pair of main lines 37A, 37B is provided between the pair of main lines 37A, 37B. The electromagnetic on-off valve 41 is capable of switching between an open position (A) corresponding to the communicating state and a closed position (B) corresponding to the blocking state. Switching of the electromagnetic on-off valve 41 is controlled based upon a command (command signal W) from the controller 43. The electromagnetic on-off valve 41 is at a closed position (B) cutting off the pair of main lines 37A, 37B in a case where the power is transmitted via the planetary continuously variable transmission mechanism 31. On the other hand, the electromagnetic on-off valve 41 is switched to the open position (A) communicating the pair of main lines 37A, 37B when performing the power transmission path switched between the planetary continuously variable transmission mechanism 31 and the direct connecting mechanism 27. At this time, the pump side clutch 33 and the motor side clutch 40 are connected and released in a state of cutting off power transmission by hydraulic power in the hydraulic circuit of the planetary continuously variable transmission mechanism 31 in a short period of time by communicating the pair of main lines 37A, 37B. As a result, the power transmission is capable of switching from the planetary continuously variable transmission mechanism 31 to the direct connecting mechanism 27 and from the direct connecting mechanism 27 to the planetary continuously variable transmission mechanism 31.

Figure 4:
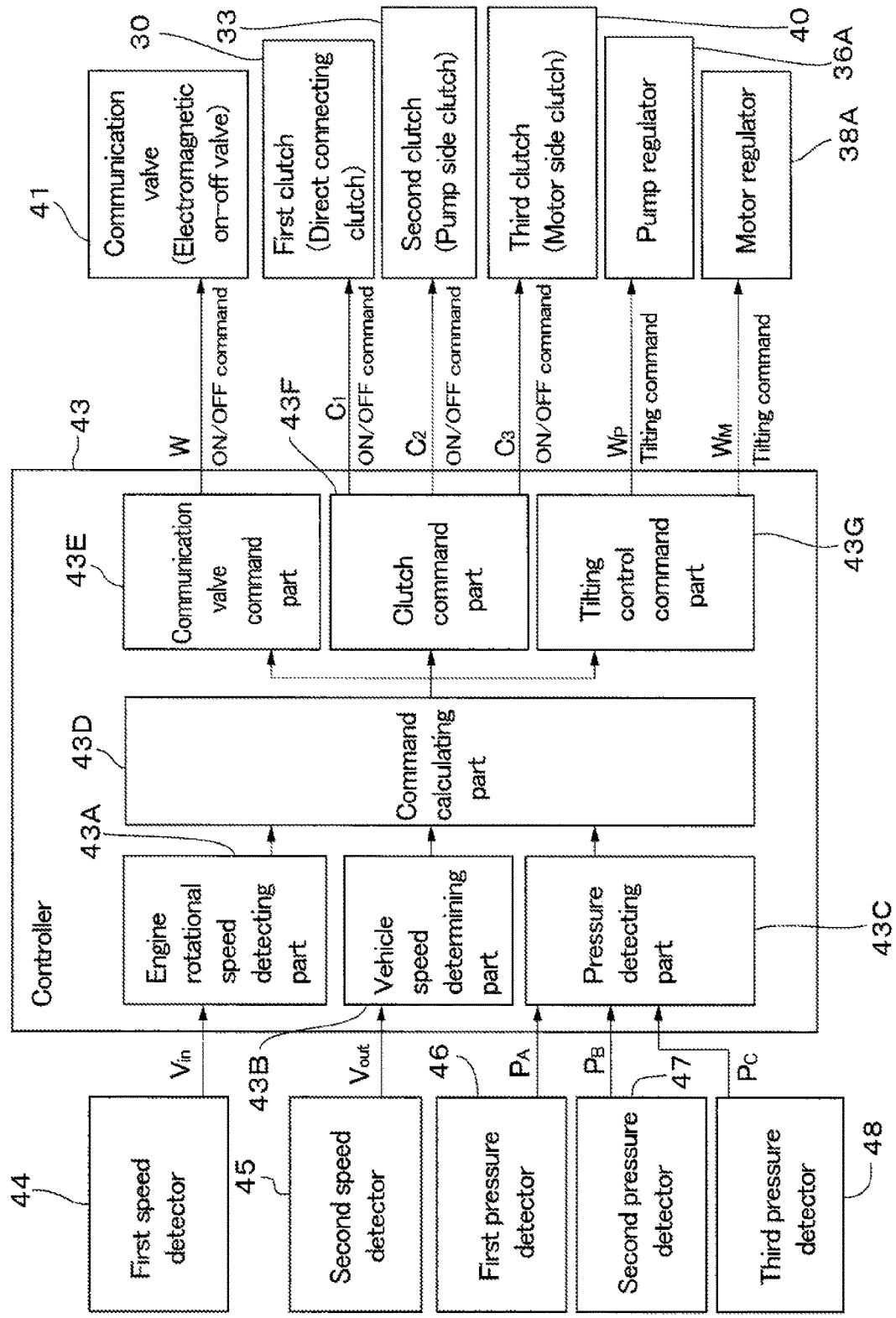

Next, an explanation will be made of the controller 43 controlling switching of the power transmission path of the transmission 21 with reference to FIGS. 3 and 4. Herein, FIG. 4 is block diagram showing the controller 43 in detail.

An input side of the controller 43 is connected to the first speed detector 44, the second speed detector 45, the first pressure detector 46, the second pressure detector 47, and the third pressure detector 48. An output side of the controller 43 is connected to the electromagnetic on-off valve 41, the direct connecting clutch 30, the pump side clutch 33, the motor side clutch 40, the regulator 36A of the hydraulic pump 36 of the planetary continuously variable transmission mechanism 31, and the regulator 38A of the hydraulic motor 38 of the planetary continuously variable transmission mechanism 31. The controller 43 is configured to comprise a microcomputer including a central processing unit (CPU), a memory and the like and the memory stores a processing program for performing an after-mentioned processing flow shown in FIGS. 5 and 6, that is, a processing program and the like used in processing a switching control of the power transmission path of the transmission 21.

The first speed detector 44 is disposed on the input shaft 22 of the transmission 21. The first speed detector 44 is a rotation detection sensor detecting the rotational speed and the rotating direction of the input shaft 22. The rotational speed of the input shaft 22 corresponds to the rotational speed of the engine 9 (hereafter referred to as "engine rotational speed $V_{in}$"). The first speed detector 44 outputs a detection signal corresponding to the engine rotational speed $V_{in}$ to the controller 43. The second speed detector 45 is disposed on the output shaft 23 of the transmission 21. The second speed detector 45 is a rotation detection sensor detecting the rotational speed of the output shaft 23 (hereafter referred to as "output rotational speed $V_{out}$") and the rotating direction. The output rotational speed $V_{out}$ corresponds to the vehicle speed. The second speed detector 45 outputs a detection signal corresponding to the output rotational speed $V_{out}$ and the rotating direction to the controller 43.

The first pressure detector 46 is disposed in one main line 37A. The first pressure detector 46 is a pressure sensor detecting the fluid pressure (pressure) of the one main line 37A. The first pressure detector 46 outputs a detection signal corresponding to the fluid pressure $P_A$ of the one main line 37A to the controller 43. The second pressure detector 47 is disposed in the other main line 37B. The second pressure detector 47 is a pressure sensor detecting the fluid pressure (pressure) of the other main line 37B. The second pressure detector 47 outputs a detection signal corresponding to the fluid pressure $P_B$ of the other main line 37B to the controller 43. The third pressure detector 48 is disposed on the direct connecting clutch 30. The third pressure detector 48 is a pressure sensor detecting the clutching pressure (pressure) of the direct connecting clutch 30. The third pressure detector 48 outputs a detection signal corresponding to the clutch pressure $P_C$ of the direct connecting clutch 30 to the controller 43.

The controller 43 adjusts the pump capacity and the motor capacity, and controls communication and blockade of the electromagnetic on-off valve 41 and connection and release of the direct connecting clutch 30, the pump side clutch 33 and the motor side clutch 40. Herein, the state of transmitting the rotation of the input shaft 22 to the output shaft 23 via the planetary continuously variable transmission mechanism 31 by releasing the direct connecting clutch 30 and connecting both the pump side clutch 33 and the motor side clutch 40 is referred to as a first state (state of planetary transmission). On the other hand, the state of transmitting the rotation of the input shaft 22 to the output shaft 23 via the direct connecting mechanism 27 by connecting the direct connecting clutch 30 and releasing both the pump side clutch 33 and the motor side clutch 40 is referred to as a second state (state of direct connection transmission). In the second state, the rotation of the input shaft 22 is transmitted to the output shaft 23 by bypassing the planetary continuously variable transmission mechanism 31.

In this case, when the controller 43 switches from the first state to the second state, the controller 43 connects the direct connecting clutch 30 and releases the pump side clutch 33 and the motor side clutch 40 after switching the electromagnetic on-off valve 41 from the closed position (B) to the open position (A). At this time, that is, the controller 43 is in the state of connecting the 3 clutches of the direct connecting clutch 30, the pump side clutch 33 and the motor side clutch 40 when the controller 43 switches from the first state to the second state. On the other hand, when the controller 43 switches from the second state to the first state, the controller 43 switches the electromagnetic on-off valve 41 from the open position (A) to the closed position (B) and releases the direct connecting clutch 30 after connecting the pump side clutch 33 and the motor side clutch 40. At this time, that is, the controller 43 is in the state of connecting the 3 clutches of the direct connecting clutch 30, the pump side clutch 33 and the motor side clutch 40 when the controller 43 switches from the second state to the first state.

In addition, the controller 43 switches the electromagnetic on-off valve 41 based upon the detection values of the first pressure detector 46 and the second pressure detector 47. The first pressure detector 46 and the second pressure detector 47 correspond to pressure detectors detecting the pressure differences of the pair of main lines 37A, 37B. The controller 43 switches the electromagnetic on-off valve 41 from the closed position (B) to the open position (A) when the detection values of the first pressure detector 46 and the second pressure detector 47 are a threshold value or less. More specifically, the controller 43 switches the electromagnetic on-off valve 41 from the closed position (B) to the open position (A) when a difference in the detection value between the first pressure detector 46 and the second pressure detector 47, that is, a pressure difference (differential pressure) between the pair of main lines 37A, 37B is a threshold value (after-mentioned first pressure threshold value) or less. The differential pressure may be detected using a differential pressure gauge (differential pressure detector) directly detecting the differential pressures. Moreover, the threshold value of the differential pressure can be determined such that the electromagnetic on-off valve 41 is switched from the closed position (B) to the open position (A) to restrict pressure variations, for example.

As shown in FIG. 4, the controller 43 comprises an engine rotational speed detecting part 43A, a vehicle speed determining part 43B, a pressure detecting part 43C, a command calculating part 43D, a communication valve command part 43E, a clutch command part 43F, and a tilting control command part 43G. The engine rotational speed $V_{in}$ is inputted to the engine rotational speed detecting part 43A from the first speed detector 44. The engine rotational speed detecting part 43A outputs the engine rotational speed $V_{in}$ to the command calculating part 43D. The output rotational speed $V_{out}$ is inputted from the second speed detector 45 to the vehicle speed determining part 43B. The vehicle speed determining part 43B outputs the output rotational speed $V_{out}$ corresponding to the vehicle speed to the command calculating part 43D. The fluid pressures $P_A$, $P_B$ and the clutch pressure $P_C$ are inputted from the first pressure detector 46, the second pressure detector 47 and the third pressure detector 48 to the pressure detecting part 43C. The pressure detecting part 43C outputs the pressure difference between the fluid pressure $P_A$ and the fluid pressure $P_B$ (=differential pressures of the pair of main lines 37A, 37B) and the clutch pressure $P_C$ to the command calculating part 43D.

The command calculating part 43D calculates the transmission output torque as the output torque of the transmission 21. Specifically, in the first state, the transmission output torque is calculated from the torque of the idler gear 29 and a transmission gear ratio of the transmission mechanism 25. The torque of the idler gear 29 is calculated from the output torque of the engine 9 calculated from the release time of an injector feeding fuels for the engine 9 as a power source to a combustion chamber and the rotational speed of the engine 9, the gear ratio of the planetary gear mechanism 32, the tilting amount of the hydraulic pump 36, the tilting amount of the hydraulic motor 38, and the fluid pressures $P_A$, $P_B$ of the pair of main lines 37A, 37B. On the other hand, in the second state, the torque of the input shaft 22 is estimated from the output torque of the engine 9 and the load torque of the hydraulic pump 10 operating the working mechanism 7, which is multiplied by the transmission gear ratio from the input shaft 22 via the direct connecting clutch 30 to the output shaft 23 to calculate the transmission output torque.

The command calculating part 43D calculates a command for the electromagnetic on-off valve 41 (solenoid valve command), commands for the clutches 30, 33, 40 (clutch command), a command for the regulator 36A of the hydraulic pump 36 (pump command), a command for the regulator 38A of the hydraulic motor 38 (motor command), based upon inputs from the engine rotational speed detecting part 43A, the vehicle speed determining part 43B and the pressure detecting part 43C and the transmission output torque values. The command calculating part 43D outputs the solenoid valve command to the communication valve command part 43E, outputs the clutch command to the clutch command part 43F, and outputs the pump command and the motor command to the tilting control command part 43G.

The solenoid valve command is inputted from the command calculating part 43D to the communication valve command part 43E. The communication valve command part 43E outputs a control command regarding opening and closing operations of the electromagnetic on-off valve 41 to the electromagnetic on-off valve 41 according to a solenoid valve command from the command calculating part 43D. That is, the communication valve command part 43E outputs ON (communication)/OFF (blockade) signal W to the electromagnetic on-off valve 41. In this case, the ON (communication) corresponds to the open position (A) of the electromagnetic on-off valve 41, while the OFF (blockade) corresponds to the closed position (B) of the electromagnetic on-off valve 41. A clutch command is inputted from the command calculating part 43D to the clutch command part 43F. The clutch command part 43F outputs a control command regarding connection and release operations of the clutches 30, 33, 40 to the clutches 30, 33, 40, based upon clutch commands from the command calculating part 43D. That is, the clutch command part 43F outputs ON (connect)/OFF (release) signals $C_1$, $C_2$, $C_3$ to the clutches 30, 33, 40. In this case, the signal $C_1$ is outputted to the direct connecting clutch 30, the signal $C_2$ is outputted to the pump side clutch 33, and the signal $C_3$ is outputted to the motor side clutch 40.

A pump command and a motor command are inputted from the command calculating part 43D to the tilting control command part 43G. The tilting control command part 43G outputs a control command regarding tilting operations of the hydraulic pump 36 and the hydraulic motor 38 to the regulator 36A of the hydraulic pump 36 and the regulator 38A of the hydraulic motor 38, based upon a pump command and a motor command from the command calculating part 43D. That is, the tilting control command part 43G outputs swash plate or inclined shaft tilting command signals $W_P$, $W_M$ to the regulator 36A of the hydraulic pump 36 and the regulator 38A of the hydraulic motor 38. In this case, the tilting command signal $W_P$ is outputted to the regulator 36A of the hydraulic pump 36, and the tilting command signal $W_M$ is outputted to the regulator 38A of the hydraulic motor 38. The hydraulic pump 36 and the hydraulic motor 38 in the hydrostatic continuously variable transmission mechanism 34 are of variable displacement type. The hydraulic pump 36 and the hydraulic motor 38 changes the discharged capacity by changing the swash plate or inclined shaft tilting angle. The hydraulic pump 36 and the hydraulic motor 38 may be single tilting or both tilting.

Next, an explanation will be made of a specific processing of the clutches 30, 33, 40 and the electromagnetic on-off valve 41 controlled by the controller 43.

Figure 7:
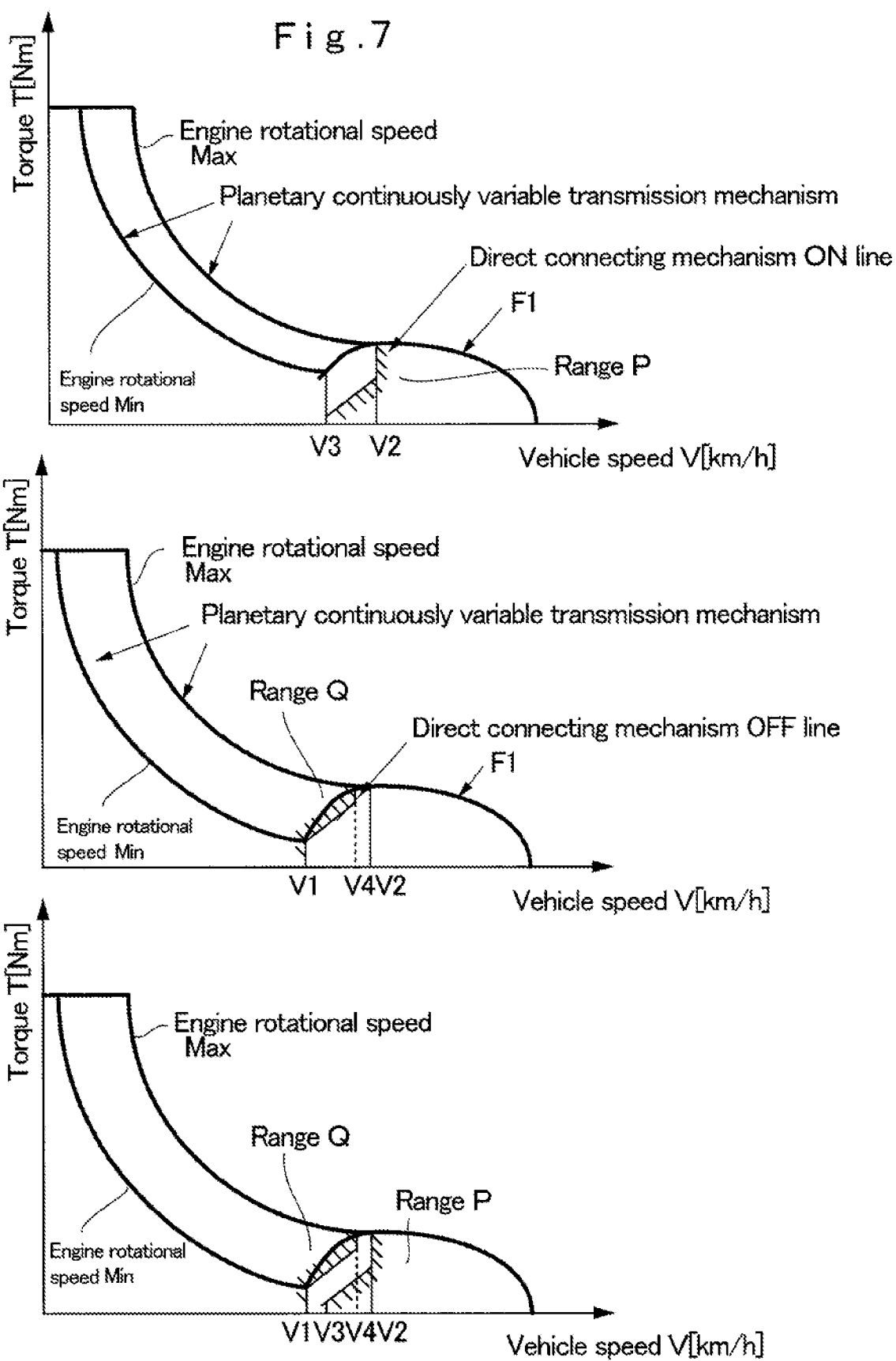
FIG. 7 is an explanatory diagram (characteristic diagram of torque and vehicle speed) showing a range Q transmitting the power with the planetary continuously variable transmission mechanism and a range P transmitting the power with the direct connecting mechanism.

Herein, FIG. 7 is a characteristic diagram showing the relationship between the torque and the vehicle speed ("torque-vehicle speed" characteristic diagram). A range P switching from the planetary continuously variable transmission mechanism 31 to the direct connecting mechanism 27 and a range Q switching from the direct connecting mechanism 27 to the planetary continuously variable transmission mechanism 31 are determined. The range P corresponds to a range of performing the transmission of the power by the direct connecting mechanism 27. The range Q corresponds to a range of performing the transmission of the power by the planetary continuously variable transmission mechanism 31. The "direct connecting mechanism ON line" in FIG. 7 is a boundary for the range P. The "direct connecting mechanism OFF line" in FIG. 7 is a boundary for the range Q. A shade portion on the boundary represents a range. A vehicle speed V1 (=first speed threshold value V1) is a vehicle speed at the minimum engine rotational speed of the direct connecting mechanism 27 capable of traveling, for example, approximately 6 km/h. A vehicle speed V2 (=second speed threshold value V2) is a vehicle speed at the maximum engine rotational speed of the planetary continuously variable transmission mechanism 31 when the power transmission is switched to the direct connecting mechanism 27, for example, approximately 9 km/h. A vehicle speed V3 (=third speed threshold value V3) is a minimum vehicle speed on the direct connecting mechanism ON line, for example, approximately 7 km/h. A vehicle speed V4 (=fourth speed threshold value V4) is a maximum vehicle speed on the direct connecting mechanism OFF line, for example, approximately 7.5 km/h.

An explanation will be made of the processing controlled by the controller 43 and changes in the state of each portion when the power transmission path of the transmission 21 is switched from the planetary continuously variable transmission mechanism 31 to the direct connecting mechanism 27 with reference to FIGS. 5 and 8.

FIG. 5 shows a specific processing flow controlled by the controller 43, that is, a control processing (determination processing) when the power transmission path is switched from the planetary continuously variable transmission mechanism 31 to the direct connecting mechanism 27. The control processing in FIG. 5 is repeatedly conducted in predetermined control cycles while the power is transmitted by the planetary continuously variable transmission mechanism 31, for example.

For example, a processing flow in FIG. 5 starts when an after-mentioned processing S14 in FIG. 6 switches the power transmission path of the transmission 21 to the planetary continuously variable transmission mechanism 31. S1 in FIG. 5 determines whether or not the vehicle speed V of the wheel loader 1 is higher than the second speed threshold value V2 (also referred to as maximum switching speed V2). The vehicle speed V corresponds to the speed of the actual wheel loader 1 (actual speed) detected by the second speed detector 45. The second speed threshold value V2 is a determination value of the vehicle speed as a standard (threshold value) switching from the planetary continuously variable transmission mechanism 31 to the direct connecting mechanism 27. If S1 determines "YES", that is, in a case where the vehicle speed V is higher than the second speed threshold value V2, the processing will proceed to S5. S5 switches the power transmission path from the planetary continuously variable transmission mechanism 31 to the direct connecting mechanism 27. That is, the controller 43 switches from the first state in which the direct connecting clutch 30 is released and both the pump side clutch 33 and the motor side clutch 40 are connected to the second state in which the direct connecting clutch 30 is connected and both the pump side clutch 33 and the motor side clutch 40 are released. The maximum switching speed V2 as the second speed threshold value V2 corresponds to a vehicle speed when the power transmission is switched to the direct connecting mechanism 27 at the maximum engine rotational speed of the planetary continuously variable transmission mechanism 31. Accordingly, in a case where the vehicle speed V is higher than the second speed threshold value V2, the power transmission path is switched to the direct connecting mechanism 27 and a processing in FIG. 6 will start.

On the other hand, in a case where S1 determines "NO", that is, the vehicle speed V is smaller than the second speed threshold value V2, the processing will proceed to S2. S2 determines whether or not the vehicle speed V is higher than the third speed threshold value V3 (also referred to as switching speed V3). As shown in FIG. 7, the third speed threshold value V3 is smaller than the second speed threshold value V2 (V3<V2). In a case where S2 determines "NO", that is, the vehicle speed V is a third speed threshold value V3 or less, the processing will proceed to S3. S3 maintains the power transmission path in the planetary continuously variable transmission mechanism 31. That is, the power transmission path remains in the planetary continuously variable transmission mechanism 31. The power transmission is not switched to the direct connecting mechanism 27. As described above, power transmission path remains in the planetary continuously variable transmission mechanism 31 and the processing will return in a case where the vehicle speed V is smaller than the maximum switching speed V2 and the vehicle speed V is smaller than the switching speed V3.

On the other hand, in a case where S2 determines "YES", that is, the vehicle speed V is higher than the third speed threshold value V3, the processing will proceed to S4. S4 determines whether or not the transmission output torque is included in the range P. That is, S4 determines whether or not the relationship between the vehicle speed V and the output torque is included in the range P in FIG. 7. The output torque is calculated by the command calculating part 43D. In a case where S4 determines "NO", that is, the relationship between the vehicle speed V and the output torque is not included in the range P in FIG. 7, the processing will proceed to S3. That is, the power transmission path is maintained in the planetary continuously variable transmission mechanism 31. As described above, in a case where the vehicle speed V is a switching speed V3 or more and smaller than the maximum switching speed V2, and is not included in the range P switching to the direct connecting mechanism 27, the power transmission path remains in the planetary continuously variable transmission mechanism 31 and the processing will return.

On the other hand, in a case where S4 determines "YES", that is, the relationship between the vehicle speed V and the output torque is included in the range P in FIG. 7, the processing will proceed to S5, and the power transmission path is switched from the planetary continuously variable transmission mechanism 31 to the direct connecting mechanism 27. As described above, the power transmission path is switched to the direct connecting mechanism 27 and the processing in FIG. 6 will start in a case where the vehicle speed V is a switching speed V3 or more and smaller than the maximum switching speed V2, and is included in the range P switching to the direct connecting mechanism 27.

Figure 8:
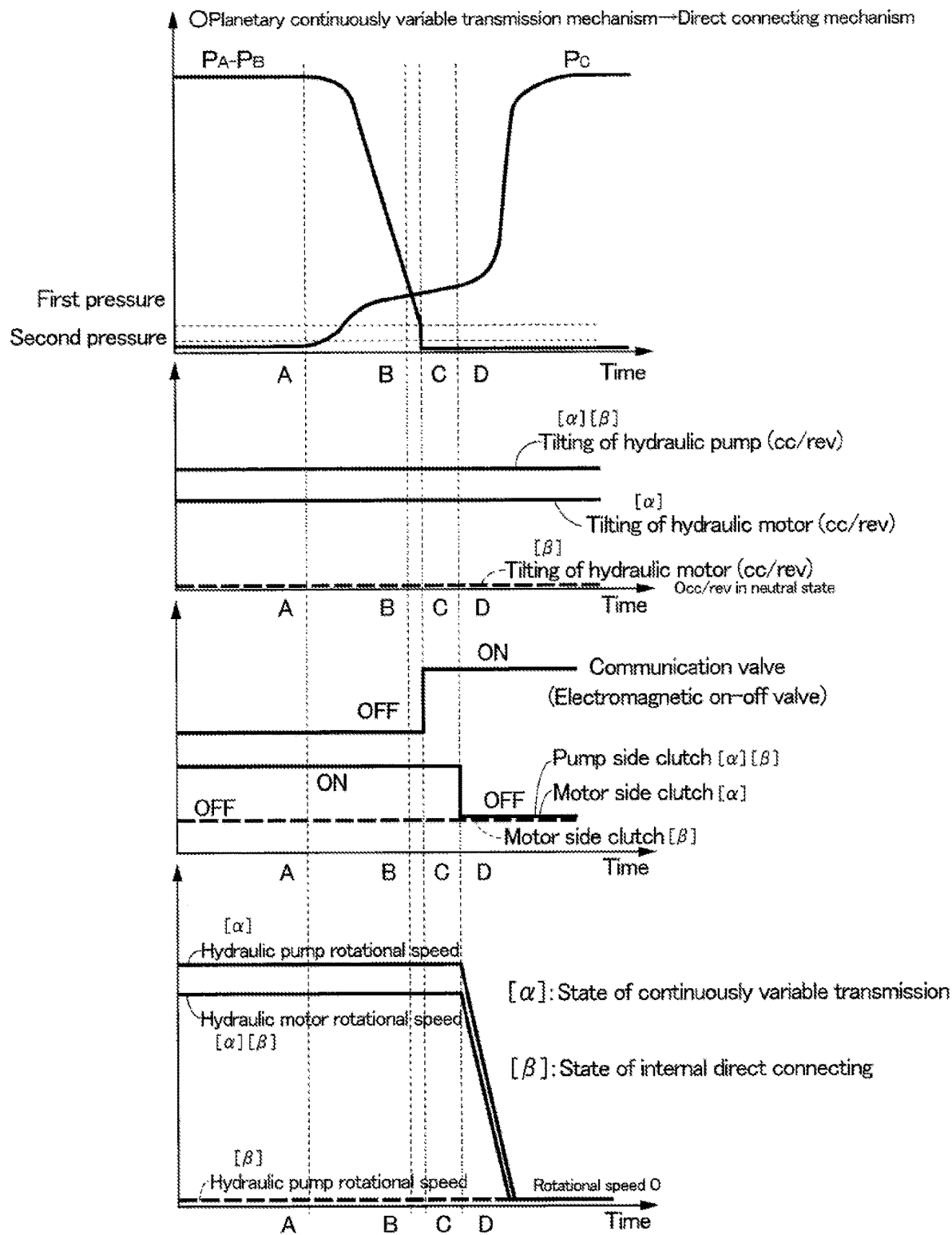
FIG. 8 is a time chart when the power is switched from the planetary continuously variable transmission mechanism to the direct connecting mechanism.

FIG. 8 shows a time chart when the power transmission path is switched from the planetary continuously variable transmission mechanism 31 to the direct connecting mechanism 27. FIG. 8 shows the pressure difference $(P_B-P_A)$ between the main lines 37A, 37B, the clutch pressure $P_C$ of the direct connecting clutch 30, the tilting amount of the hydraulic pump 36, the tilting amount of the hydraulic motor 38, the state of the electromagnetic on-off valve 41, the state of the pump side clutch 33, the state of the motor side clutch 40, the rotational speed of the hydraulic pump 36 and the rotational speed of the hydraulic motor 38.

First, an explanation will be made of a case where the power transmission path is switched from the state of the planetary continuously variable transmission mechanism 31 in the continuously variable transmission to the direct connecting mechanism 27. The wheel loader 1 is in a low-speed range in a case where the power transmission path is the planetary continuously variable transmission mechanism 31. In this case, the controller 43 sets the pump side clutch 33 and the motor side clutch 40 at the "ON (connect)", the direct connecting clutch 30 at the "OFF (release)" and the electromagnetic on-off valve 41 at the "OFF (blockade)". In a case where the processing in FIG. 5 proceeds to S5, the controller 43 switches the power transmission path to the direct connecting mechanism 27. At this time, the controller 43 outputs an ON command from the clutch command part 43F to the direct connecting clutch 30 (time point A). As a result, the clutch pressure $P_C$ increases and the direct connecting clutch 30 will start connection (time point B). Thereafter, the controller 43 outputs an ON command from the communication valve command part 43E to the electromagnetic on-off valve 41 when the pressure difference $(P_B-P_A)$ between the main lines 37A, 37B is a first pressure threshold value or less, and switches the electromagnetic on-off valve 41 from the closed position (B) to the open position (A). As a result, the main lines 37A, 37B in the hydrostatic continuously variable transmission mechanism 34 are communicated (time point C). Thereafter, the controller 43 acquires from the pressure detecting part 43C that the pressure difference $(P_B-P_A)$ between the main lines 37A, 37B is a second pressure threshold value or less, and outputs a release command from the clutch command part 43F to the pump side clutch 33 and the motor side clutch 40. As a result, the pump side clutch 33 and the motor side clutch 40 are released (time point D). As a result, the power transmission path is completely switched from the planetary continuously variable transmission mechanism 31 to the direct connecting mechanism 27. The second pressure threshold value is set as a determination value determining whether or not the pressure difference $(P_B-P_A)$ between the main lines 37A, 37B is 0 (or nearly 0), that is, a determination value determining whether or not the power transmission by the hydraulic power of the hydrostatic continuously variable transmission mechanism 34 is cut off (released). As described above, the case where the power transmission path is switched from the state of the planetary continuously variable transmission mechanism 31 in the continuously variable transmission to the direct connecting mechanism 27 has been illustrated. In a case where the power transmission path is switched from the planetary continuously variable transmission mechanism 31 in the internal direct connection to the direct connecting mechanism 27, the difference is that prior to the time point A, the motor side clutch 40 remains OFF, the tilting of the hydraulic motor 38 is neutral and the pump rotational speed is 0 (or nearly 0).

Next, an explanation will be made of the processing controlled by the controller 43 and changes in the state of each portion when the power transmission path of the transmission 21 is switched from the direct connecting mechanism 27 to the planetary continuously variable transmission mechanism 31 with reference to FIGS. 6 and 9.

FIG. 6 shows a specific processing flow performed by the controller 43, that is, a control processing (determination processing) when the power transmission path is switched from the direct connecting mechanism 27 to the planetary continuously variable transmission mechanism 31. The control processing in FIG. 9 is repeatedly conducted in predetermined control cycles while the power is transmitted by the direct connecting mechanism 27, for example.

For example, a processing flow in FIG. 6 starts when the processing S5 in FIG. 5 switches the power transmission path of the transmission 21 to the direct connecting mechanism 27. S11 in FIG. 6 determines whether or not the vehicle speed V is smaller than the fourth speed threshold value V4 (also referred to as switching speed V4). The fourth speed threshold value V4 is a determination value of the vehicle speed as a standard (threshold value) switching from the direct connecting mechanism 27 to the planetary continuously variable transmission mechanism 31. In a case where S11 determines "NO", that is, the vehicle speed V is a fourth speed threshold value V4 or less, the processing will proceed to S12. S12 maintains the power transmission path in the direct connecting mechanism 27. That is, the power transmission path remains in the direct connecting mechanism 27. The power transmission is not switched to the planetary continuously variable transmission mechanism 31. As described above, the power transmission path remains in the direct connecting mechanism 27 and the processing will return when the vehicle speed V is a switching speed V4 or more.

On the other hand, in a case where S11 determines "YES", that is, the vehicle speed V is smaller than the fourth speed threshold value V4, the processing will proceed to S13. S13 determines whether or not the vehicle speed V is smaller than the first speed threshold value V1 (also referred to as minimum switching speed V1). As shown in FIG. 7, the first speed threshold value V1 is smaller than the fourth speed threshold value V4 (V1<V4). In a case where S13 determines "YES", that is, the vehicle speed V is smaller than the first speed threshold value V1, the processing will proceed to S14. S14 switches the power transmission path from the direct connecting mechanism 27 to the planetary continuously variable transmission mechanism 31. That is, the controller 43 switches from the second state in which the direct connecting clutch 30 is connected and both the pump side clutch 33 and the motor side clutch 40 are released to the first state in which the direct connecting clutch 30 is released and both the pump side clutch 33 and the motor side clutch 40 are connected. The minimum switching speed V1 as the first speed threshold value V1 corresponds to a vehicle speed when the power transmission is switched to the planetary continuously variable transmission mechanism 31 at the minimum engine rotational speed of the direct connecting mechanism 27. Accordingly, in a case where the vehicle speed V is smaller than the first speed threshold value V1, the power transmission path is switched to the planetary continuously variable transmission mechanism 31 and a processing in FIG. 5 will start.

On the other hand, in a case where S13 determines "NO", that is, the vehicle speed V is the first speed threshold value V1 or more, the processing will proceed to S15. S15 determines whether or not the transmission output torque is included in a range Q. That is, S15 determines whether or not the relationship between the vehicle speed V and the output torque is included in the range Q in FIG. 7. In a case where S15 determines "NO", that is, the relationship between the vehicle speed V and the output torque is not included in the range Q in FIG. 7, the processing will proceed to S12. That is, the power transmission path remains in the direct connecting mechanism 27. As described above, in a case where the vehicle speed V is a switching speed V1 or more and the maximum switching speed V4 or less, and is not included in the range Q switching to the planetary continuously variable transmission mechanism 31, the power transmission path remains in the direct connecting mechanism 27 and the processing will return.

On the other hand, in a case where S15 determines "YES", that is, the relationship between the vehicle speed V and the output torque is included in the range Q in FIG. 7, the processing will proceed to S14, and the power transmission path is switched from the direct connecting mechanism 27 to the planetary continuously variable transmission mechanism 31. As described above, in a case where the vehicle speed V is a switching speed V1 or more and the maximum switching speed V4 or less, and is included in the range Q switching to the planetary continuously variable transmission mechanism 31, the power transmission path is switched to the planetary continuously variable transmission mechanism 31 and the processing in FIG. 5 will start.

Figure 9:
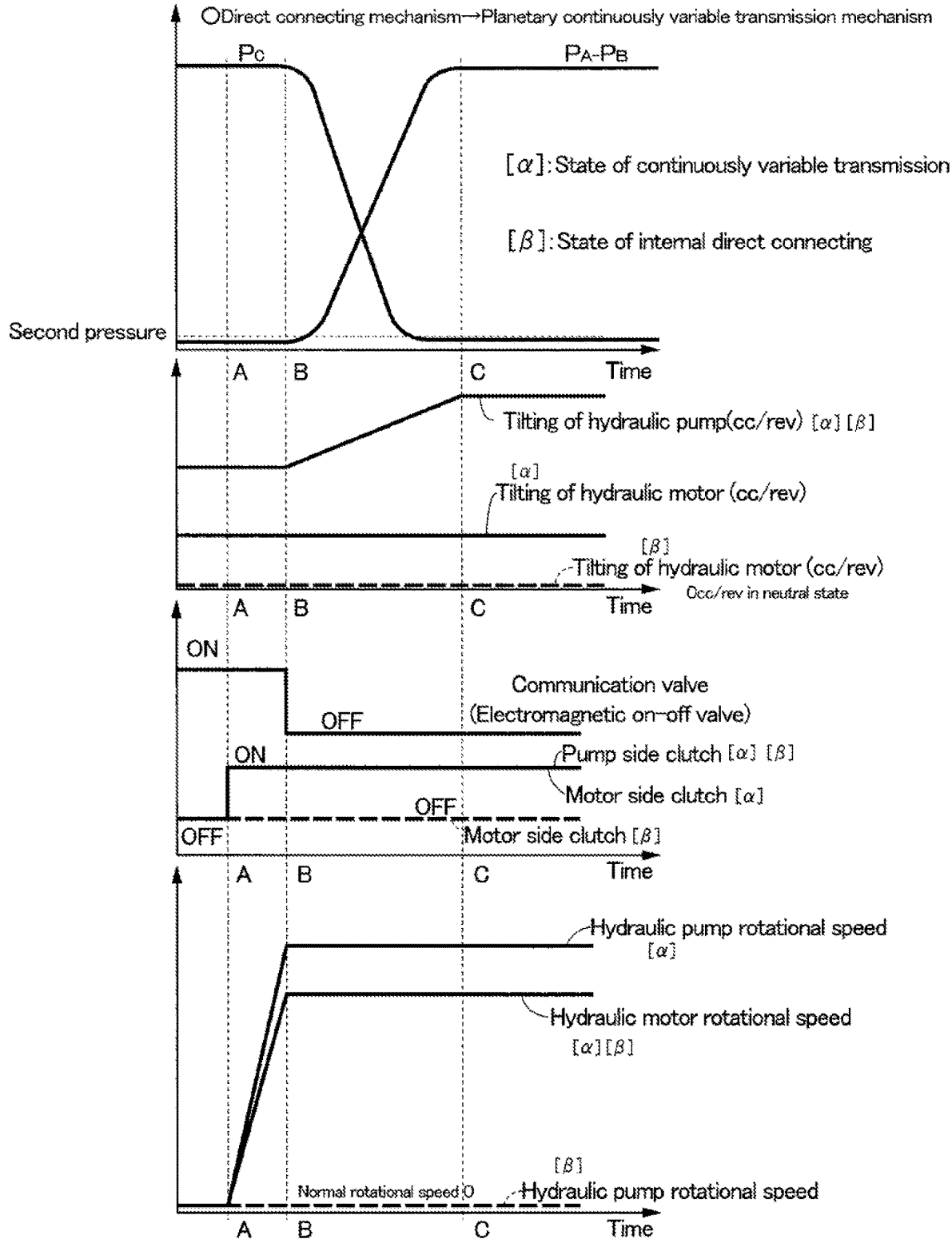
FIG. 9 is a time chart when the power is switched from the direct connecting mechanism to the planetary continuously variable transmission mechanism.

FIG. 9 shows a time chart when the power transmission path is switched from the direct connecting mechanism 27 to the planetary continuously variable transmission mechanism 31. FIG. 9 shows the pressure difference $(P_B-P_A)$ between the main lines 37A, 37B, the clutch pressure $P_C$ of the direct connecting clutch 30, the tilting amount of the hydraulic pump 36, the tilting amount of the hydraulic motor 38, the state of the electromagnetic on-off valve 41, the state of the pump side clutch 33, the state of the motor side clutch 40, the rotational speed of the hydraulic pump 36 and the rotational speed of the hydraulic motor 38.

First, an explanation will be made of a case where the power transmission path is switched from the direct connecting mechanism 27 to the state of the planetary continuously variable transmission mechanism 31 in the continuously variable transmission. In a case where the power transmission path is the direct connecting mechanism 27, the wheel loader 1 is in a high-speed range. In this case, the controller 43 sets the pump side clutch 33 and the motor side clutch 40 at the "OFF (release)", the direct connecting clutch 30 at the "ON (connect)" and the electromagnetic on-off valve 41 at the "ON (communication)". If the processing proceeds to S14 in FIG. 6, the controller 43 acquires from the pressure detecting part 43C that the pressure difference $(P_B-P_A)$ between the main lines 37A, 37B is a second pressure threshold value or less, and outputs a connection command from the clutch command part 43F to the pump side clutch 33 and the motor side clutch 40. As a result, the pump side clutch 33 and the motor side clutch 40 are connected (time point A). This connection allows the hydraulic pump 36 and the hydraulic motor 38 to start and increase the rotation to a predetermined rotational speed. The controller 43 outputs an OFF command from the communication valve command part 43E to the electromagnetic on-off valve 41 to switch the electromagnetic on-off valve 41 from the open position (A) to the closed position (B) (time point B) after the pump side clutch 33 and the motor side clutch 40 are completely connected. Thereafter, the tilting of the hydraulic pump 36 is increased to increase the delivery rate of the hydraulic pump 36 and the pressure difference $(P_B-P_A)$ between the main lines 37A, 37B. As a result, power transmission by hydraulic power in the planetary continuously variable transmission mechanism 31 is allowed (time point C). Simultaneously, an OFF command is outputted to the direct connecting clutch 30 to release the direct connecting clutch 30. As a result, the power transmission path is completely switched from the direct connecting mechanism 27 to the planetary continuously variable transmission mechanism 31. As described above, the case where the power transmission path is switched from the direct connecting mechanism 27 to the state of the planetary continuously variable transmission mechanism 31 in the continuously variable transmission has been illustrated. In a case where the power transmission path is switched from the direct connecting mechanism 27 to the planetary continuously variable transmission mechanism 31 in the internal direct connection, the difference is that prior to the time point A, the motor side clutch 40 remains OFF, the tilting of the hydraulic motor 38 is neutral and the pump rotational speed is 0 (or nearly 0).

As described above, according to an embodiment, the clutches 30, 33, 40 are provided between the direct connecting mechanism 27 and the idler gear 29, between the planetary gear mechanism 32 and the hydraulic pump 36, and between the hydraulic motor 38 and the idler gear 29, respectively, and the power transmission path is switched, depending on the connection and release of the clutches 30, 33, 40. Thus, power transmission loss can be reduced, resulting in a higher operational efficiency. In a case where the power is transmitted via the planetary continuously variable transmission mechanism 31, the hydraulic pump 36 and the hydraulic motor 38 rotates. Therefore, in a case where the power is transmitted via the direct connecting mechanism 27, rotation loss of the hydraulic pump 36 and the hydraulic motor 38 can be reduced, resulting in a higher operational efficiency. Moreover, the electromagnetic on-off valve 41 as a communication valve is provided between the pair of main lines 37A, 37B connecting the hydraulic pump 36 and the hydraulic motor 38. Therefore, the clutches 30, 33, 40 can stably be connected and released in the state of cutting off the power transmission by the hydraulic power in the hydraulic circuit of the planetary continuously variable transmission mechanism 31 (hydrostatic continuously variable transmission mechanism 34) in a short period of time by communicating the electromagnetic on-off valve 41. As a result, the power transmission path can stably be switched.

According to an embodiment, the pump side clutch 33 (second clutch) and the motor side clutch 40 (third clutch) are each a synchromesh mechanism clutch. Therefore, the synchromesh mechanism clutch can stably be connected and released in the state of cutting off the power by rotation of the hydraulic pump 36 and the hydraulic motor 38 in a short period of time by allowing the electromagnetic on-off valve 41 to communicate the hydraulic pump 36 and the hydraulic motor 38. As a result, a synchromesh mechanism clutch with a low drag torque can be used when the pump side clutch 33 and the motor side clutch 40 are released, and a transmission 21 (transmission) having reduced power loss of the vehicle and a high transmission efficiency can be provided.

According to an embodiment, when the controller 43 switches the power transmission path from the first state in which the power transmission path is in the planetary continuously variable transmission mechanism 31 to the second state in which the power transmission path is in the direct connecting mechanism 27, the controller 43 releases the pump side clutch 33 and the motor side clutch 40 after the controller 43 switches the electromagnetic on-off valve 41 from the closed position (B) in the blocking state to the open position (A) in the communicating state. Therefore, the pump side clutch 33 and the motor side clutch 40 can smoothly be released in the state of cutting off the power transmission by the hydraulic power in the hydraulic circuit of the planetary continuously variable transmission mechanism 31 (hydrostatic continuously variable transmission mechanism 34) in a short period of time by switching the electromagnetic on-off valve 41 from the closed position (B) to the open position (A).

According to an embodiment, when the controller 43 switches from the second state in which the direct connecting mechanism 27 is the power transmission path to the first state in which the planetary continuously variable transmission mechanism 31 is the power transmission path, the controller 43 switches the electromagnetic on-off valve 41 from the open position (A) in the communicating state to the closed position (B) in the blocking state after the controller 43 connects the pump side clutch 33 and the motor side clutch 40. Therefore, pressure variation can be reduced when the pump side clutch 33 and the motor side clutch 40 are connected, and the pump side clutch 33 and the motor side clutch 40 can smoothly be connected.

According to an embodiment, the controller 43 allows the 3 clutches 30, 33, 40 of the direct connecting clutch 30 (first clutch), the pump side clutch 33 and the motor side clutch 40 to be connected when the power transmission is switched from the first state to the second state. Therefore, variations in output torque can be reduced when the power transmission is switched from the first state to the second state.

According to an embodiment, the controller 43 allows the 3 clutches 30, 33, 40 of the direct connecting clutch 30, the pump side clutch 33 and the motor side clutch 40 to be connected when the power transmission is switched from the second state to the first state. Therefore, variations in output torque can be reduced when the power transmission is switched from the second state to the first state.

According to an embodiment, the controller 43 switches the electromagnetic on-off valve 41 from the closed position (B) to the open position (A) when the pressure difference between the pair of main lines 37A, 37B detected by the pressure detectors 46, 47 is a threshold value (first pressure threshold value) or less. Therefore, sharp pressure variations generated when the pair of main lines 37A, 37B are communicated by switching the electromagnetic on-off valve 41 from the closed position (B) to the open position (A) can be reduced.

According to an embodiment, a communication valve communicating and cutting off the pair of main lines 37A, 37B is defined as the electromagnetic on-off valve 41. Therefore, a section between the pair of main lines 37A, 37B can be switched from the blocking state to the communicating state by switching the electromagnetic on-off valve 41 from the closed position (B) that is a blockade position to the open position (A) that is a communication position. On the other hand, the section between the pair of main lines 37A, 37B can be switched from the communicating state to the blocking state by switching the electromagnetic on-off valve 41 from the open position (A) to the closed position (B).

The embodiment are explained by taking the case where the pump side clutch 33 and the motor side clutch 40 are each a synchromesh mechanism clutch as an example. However, not limited thereto, for example, the pump side clutch (second clutch) and the motor side clutch (third clutch) may each be a dog clutch or wet multiple-disk clutch.

Figure 10:
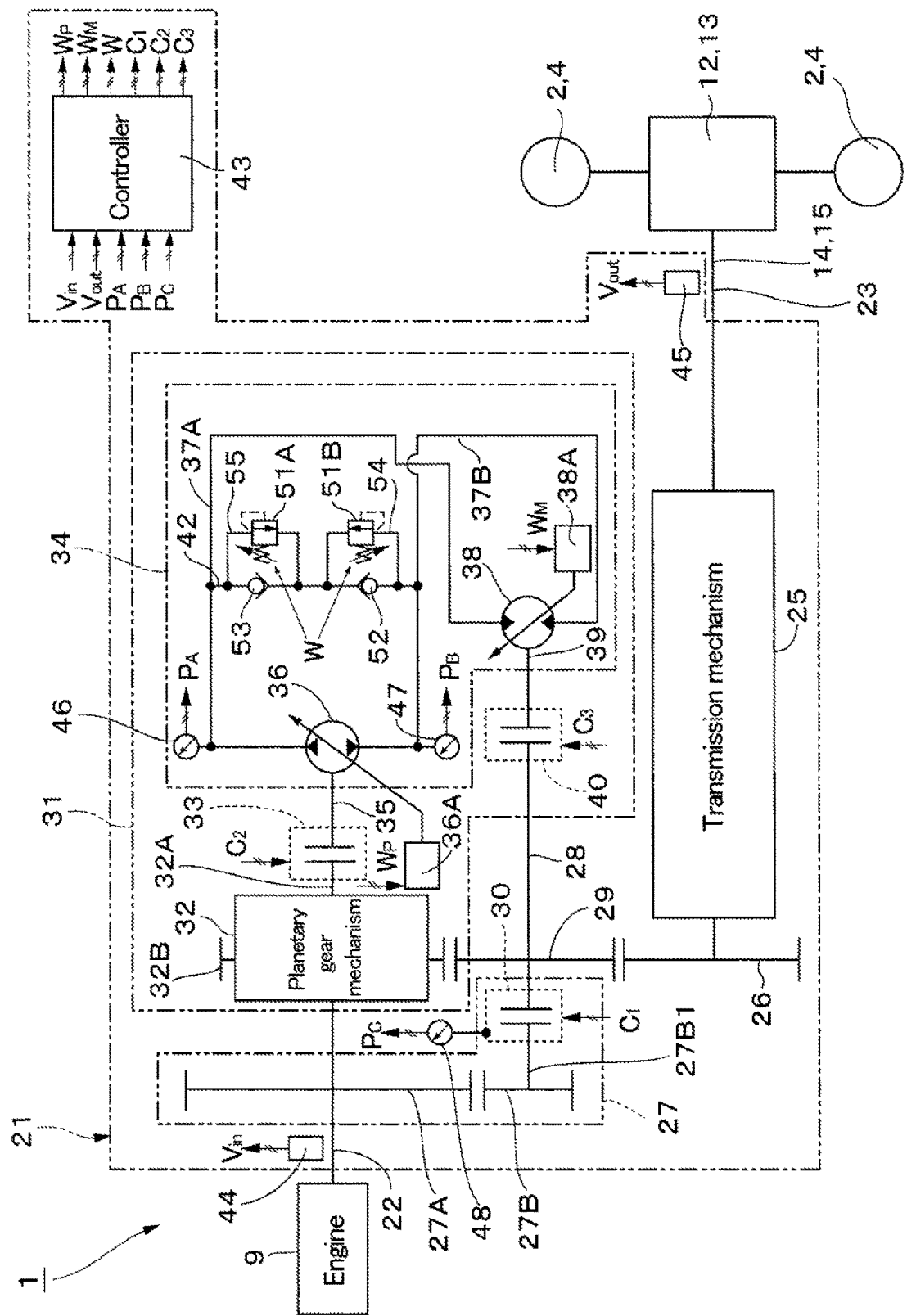
FIG. 10 is a configuration diagram showing the power transmission paths of a wheel loader provided with a power transmission device for a vehicle according to a first variant together with a controller.

The embodiment are explained by taking the case where a communication valve communicating and cutting off the pair of main lines 37A, 37B is defined as an electromagnetic on-off valve 41 as an example. However, not limited thereto, for example, like a first variant shown in FIG. 10, communication valves capable of switching between a communicating state and a blocking state between the pair of main lines 37A, 37B may be electromagnetic relief valves 51A, 51B capable of changing a set value (relief set value, relief starting pressure). Herein, the connecting line 42 connecting the pair of main lines 37A, 37B is provided with check valves 52, 53. The one check valve 52 allows pressurized oil to circulate from the one main line 37A side to the other main line 37B side and prevents the pressurized oil from circulating in the opposite direction. The other check valve 53 allows pressurized oil to circulate from the other main line 37B side to the one main line 37A side and prevents the pressurized oil from circulating in the opposite direction. Bypass lines 54, 55 bypassing the respective check valves 52, 53 are connected to the connecting line 42. The electromagnetic relief valves 51A, 51B are provided on the way of the bypass lines 54, 55.

The electromagnetic relief valves 51A, 51B are each configured by an electrically-operated variable relief valve changing the valve opening pressure (relief pressure) based upon a command signal (command signal W) from the controller 43. Changes in set values (relief set value, relief starting pressure) of the electromagnetic relief valves 51A, 51B are controlled based upon a command signal (command signal W) from the controller 43. In the electromagnetic relief valves 51A, 51B, the set value is decreased to achieve a communicating state communicating the pair of main lines 37A, 37B and increased to achieve a blocking state cutting off the pair of main lines 37A, 37B.

Accordingly, the first variant uses the electromagnetic relief valves 51A, 51B, which are each a variable relief valve, as a means of cutting off power transmission by the hydraulic power in the hydrostatic continuously variable transmission mechanism 34. In the electromagnetic relief valves 51A, 51B, the relief pressure normally set at a predetermined value on the high pressure side (for example, from 35 MPa to 50 MPa). The relief pressure of the electromagnetic relief valves 51A, 51B is changed to a predetermined value on the low pressure side (for example, minimum value) when the power transmission path of transmission 21 is switched from the planetary continuously variable transmission mechanism 31 to the direct connecting mechanism 27. That is, the pressure is relieved between the pair of main lines 37A, 37B by the electromagnetic relief valve 51A, 51B. Therefore, the pump side clutch 33 and the motor side clutch 40 can be connected and released in the state of cutting off power transmission by hydraulic power in the hydrostatic continuously variable transmission mechanism 34. As a result, the power transmission can be switched from the planetary continuously variable transmission mechanism 31 to the direct connecting mechanism 27. As communication valves, it can be configured to provide both the electromagnetic on-off valve 41 and the electromagnetic relief valves 51A, 51B. In this case, the electromagnetic on-off valve 41 and the electromagnetic relief valve 51A, 51B can be provided in parallel.

Figure 11:
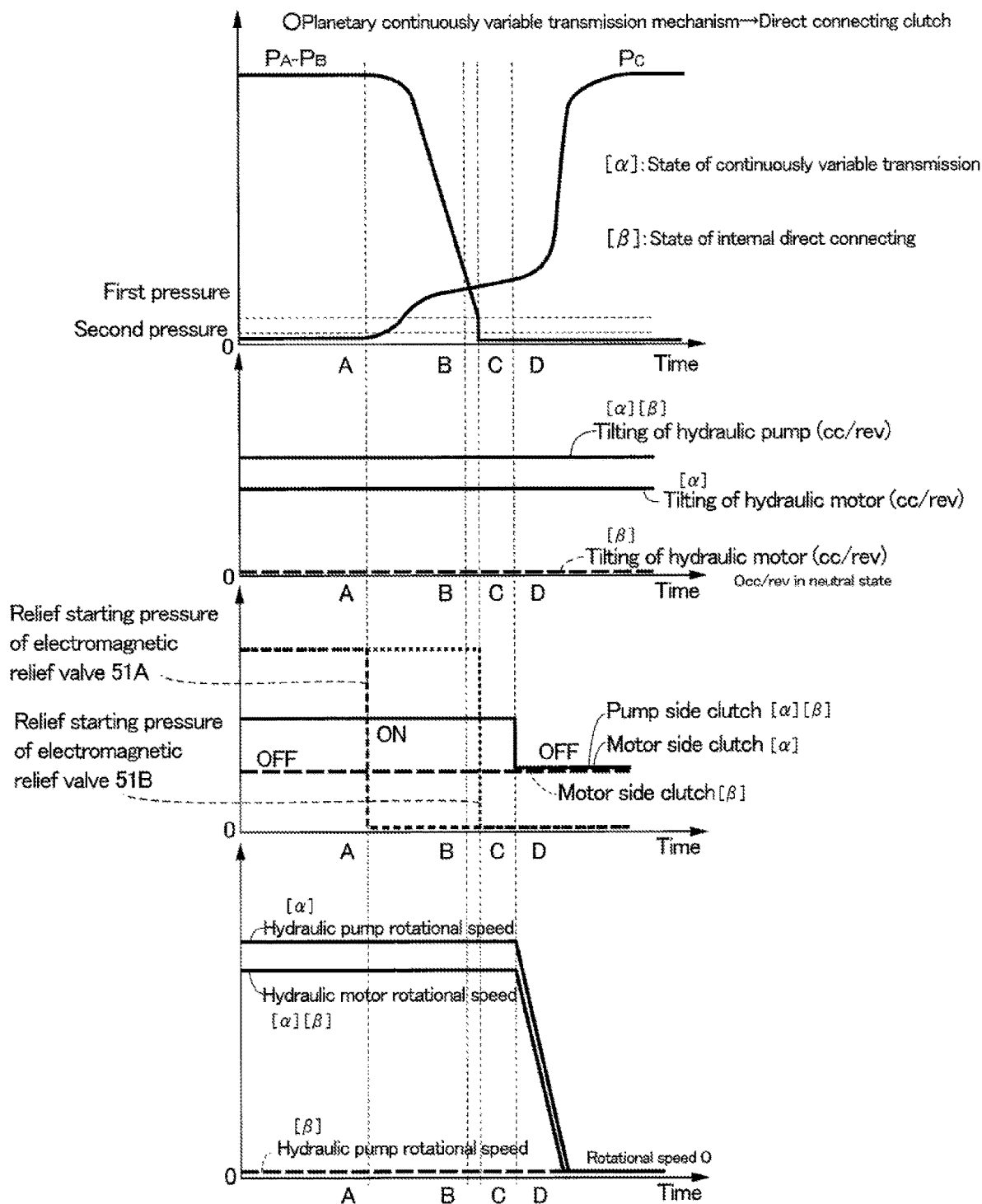
FIG. 11 is a time chart when the power is switched from a planetary continuously variable transmission mechanism to a direct connecting mechanism according to the first variant.

FIG. 11 shows a time chart of switching the power transmission path from the state of the planetary continuously variable transmission mechanism 31 in the continuously variable transmission to the direct connecting mechanism 27 in a first variant. In a case where the power transmission path is the planetary continuously variable transmission mechanism 31, the wheel loader 1 is in a low-speed range. The controller 43 sets the pump side clutch 33 and the motor side clutch 40 at the "ON (connect)" and the direct connecting clutch 30 at the "OFF (release)", and maintains a high relief starting pressure of the electromagnetic relief valve 51A and the electromagnetic relief valve 51B. If the processing in FIG. 5 proceeds to S5, the controller 43 outputs an ON command (connection command) from the clutch command part 43F to the direct connecting clutch 30. In addition to that, the controller 43 outputs a command reducing the relief starting pressure from an electromagnetic relief valve command part (not shown) outputting a control command of a relief starting pressure to the electromagnetic relief valve 51A and the electromagnetic relief valve 51B to the electromagnetic relief valve 51A (time point A). As a result, the relief starting pressure of the electromagnetic relief valve 51A is reduced (time point A). Thereafter, the clutch pressure $P_C$ increases, and the direct connecting clutch 30 will start connection (time point B). Thereafter, the controller 43 outputs a command reducing the relief starting pressure from the electromagnetic relief valve command part to the electromagnetic relief valve 51B when the pressure difference ($P_B-P_A$) between the main lines 37A and the main lines 37B is a first pressure threshold value or less (time point C). Thereafter, the controller 43 acquires from the pressure detecting part 43C that the pressure difference ($P_B-P_A$) between the main line 37A and the main line 37B is a second pressure threshold value or less, and outputs an OFF command (release command) from the clutch command part 43F to the pump side clutch 33 and the motor side clutch 40. As a result, the pump side clutch 33 and the motor side clutch 40 are released (time point D). As a result, the power transmission path is completely switched from the planetary continuously variable transmission mechanism 31 to the direct connecting mechanism 27.

Since relief starting pressures of the electromagnetic relief valve 51A and the electromagnetic relief valve 51B are held high during the period from the time point 0 to the time point A shown in FIG. 11, the flow of a hydraulic fluid traveling from the main line 37A toward the main line 37B through the connecting line 42 and the flow of a hydraulic fluid traveling from the main lines 37B toward the main line 37A are both in the blocking state. Therefore, the power is capable of transmitting in both directions of the hydraulic pump 36 and the hydraulic motor 38. On the other hand, a relief starting pressure of the electromagnetic relief valve 51A is held low and a relief starting pressure of the electromagnetic relief valve 51B is held high during the period from the time point A to the time point C. That is, the flow of hydraulic fluid traveling from the main line 37A toward the main line 37B through the connecting line 42 is communicated, while the flow of hydraulic fluid traveling from the main line 37B to the main line 37A is in a blocking state. Therefore, the power is capable of transmitting from the hydraulic pump 36 to the hydraulic motor 38, while the power transmission from the hydraulic motor 38 to the hydraulic pump 36 is cut off. On the other hand, since relief starting pressures of both the electromagnetic relief valve 51A and the electromagnetic relief valve 51B are held low during the period after the time point C, the flow of a hydraulic fluid traveling through the connecting line 42 from the main line 37A toward the main line 37B and the flow of a hydraulic fluid traveling from the main line 37B toward the main line 37A are both in the communicating state. Therefore, the power transmission is cut off in both directions of the hydraulic pump 36 and the hydraulic motor 38.

This type of control allows for power transmission in both directions of the hydraulic pump 36 and the hydraulic motor 38 during the period from the time point 0 to the time point A, thereby achieving power transmission through the planetary continuously variable transmission mechanism 31 and the idler gear 29 between the input shaft 22 and the output shaft 23. As a result, the power transmitted from the engine 9 to the input shaft 22 is transmitted to the front wheel 2 and the rear wheel 4 via the output shaft 23, the front axle 12 and the rear axle 13. Input forces from the front wheel 2 and the rear wheel 4 can be transmitted from the input shaft 22 to the engine 9 via the front axle 12, the rear axle 13 and the output shaft 23. That is, the transmission 21 is capable of transmitting the power in both cases where the power outputted from the engine 9 is transmitted to the front wheel 2 and the rear wheel 4 to accelerate the wheel loader 1 and where forces transmitted from the front wheel 2 and the rear wheel 4 are transmitted to the engine 9 to decelerate the wheel loader 1 to allow the engine 9 to absorb the power (engine brake). Therefore, this allows the engine 9 to not only accelerate but also decelerate (engine brake) the wheel loader 1, and reduce the load on a braking device (not shown) mounted in the front axle 12 and the rear axle 13.

On the other hand, the power is capable of transmitting from the hydraulic pump 36 to the hydraulic motor 38 during the period from the time point A to the time point C, while the power transmission from the hydraulic motor 38 to the hydraulic pump 36 is cut off. Therefore, the power transmitted from the input shaft 22 to the planetary continuously variable transmission mechanism 31 is capable of transmitting to the idler gear 29, but the power cannot be transmitted from the idler gear 29 to the input shaft 22 through the planetary continuously variable transmission mechanism 31. Since the direct connecting clutch 30 is provided with the clutch pressure $P_C$ during the period after time point A, the power transmitted to the input shaft 22 can be transmitted to the idler gear 29 via the direct connecting mechanism 27. As a result, a "state of allowing the power transmitted to the input shaft 22 to be transmitted to the idler gear 29 via the direct connecting mechanism 27", a "state of allowing the power transmitted to the input shaft 22 to be transmitted to the idler gear 29 via the planetary continuously variable transmission mechanism 31", a "state of allowing the power transmitted to the input shaft 22 to be transmitted to the idler gear 29 via the direct connecting mechanism 27 and cutting off power transmission to the input shaft 22 through the planetary continuously variable transmission mechanism 31" can simultaneously be prepared. Therefore, since a "power circulation state of transmitting the power transmitted to the input shaft 22 to the idler gear 29 via the direct connecting mechanism 27 and transmitting the power to the input shaft 22 through the planetary continuously variable transmission mechanism 31" is not provided, the power transmission path can readily be switched from the planetary continuously variable transmission mechanism 31 to the direct connecting mechanism 27.

Since the main line 37A and the main line 37B are in the communicating state in both directions through the connecting line 42 during the period after the time point C, they are in the state of cutting off power transmission in both directions of the hydraulic pump 36 and the hydraulic motor 38. Therefore, the pump side clutch 33 and the motor side clutch 40 can stably be released in the state of cutting off power transmission by hydraulic power in the hydraulic circuit of the planetary continuously variable transmission mechanism 31 (hydrostatic continuously variable transmission mechanism 34).

The control of relief starting pressures of the electromagnetic relief valve 51A and the electromagnetic relief valve 51B from the time point 0 to the time point D can readily switch the power transmission path from the planetary continuously variable transmission mechanism 31 to the direct connecting mechanism 27 while reducing torque variations.

As described above, the case where the power transmission path is switched from the planetary continuously variable transmission mechanism 31 in the continuously variable transmission to the direct connecting mechanism 27 has been illustrated. Relief starting pressures of the electromagnetic relief valve 51A and the electromagnetic relief valve 51B are controlled in a similar manner in a case where the power transmission path is switched from the planetary continuously variable transmission mechanism 31 in the internal direct connection to the direct connecting mechanism 27. The difference is that the motor side clutch 40 is OFF from the time point 0, the tilting of the hydraulic motor 38 is neutral, and the rotational speed of the hydraulic pump 36 is 0 (or nearly 0).

Figure 12:
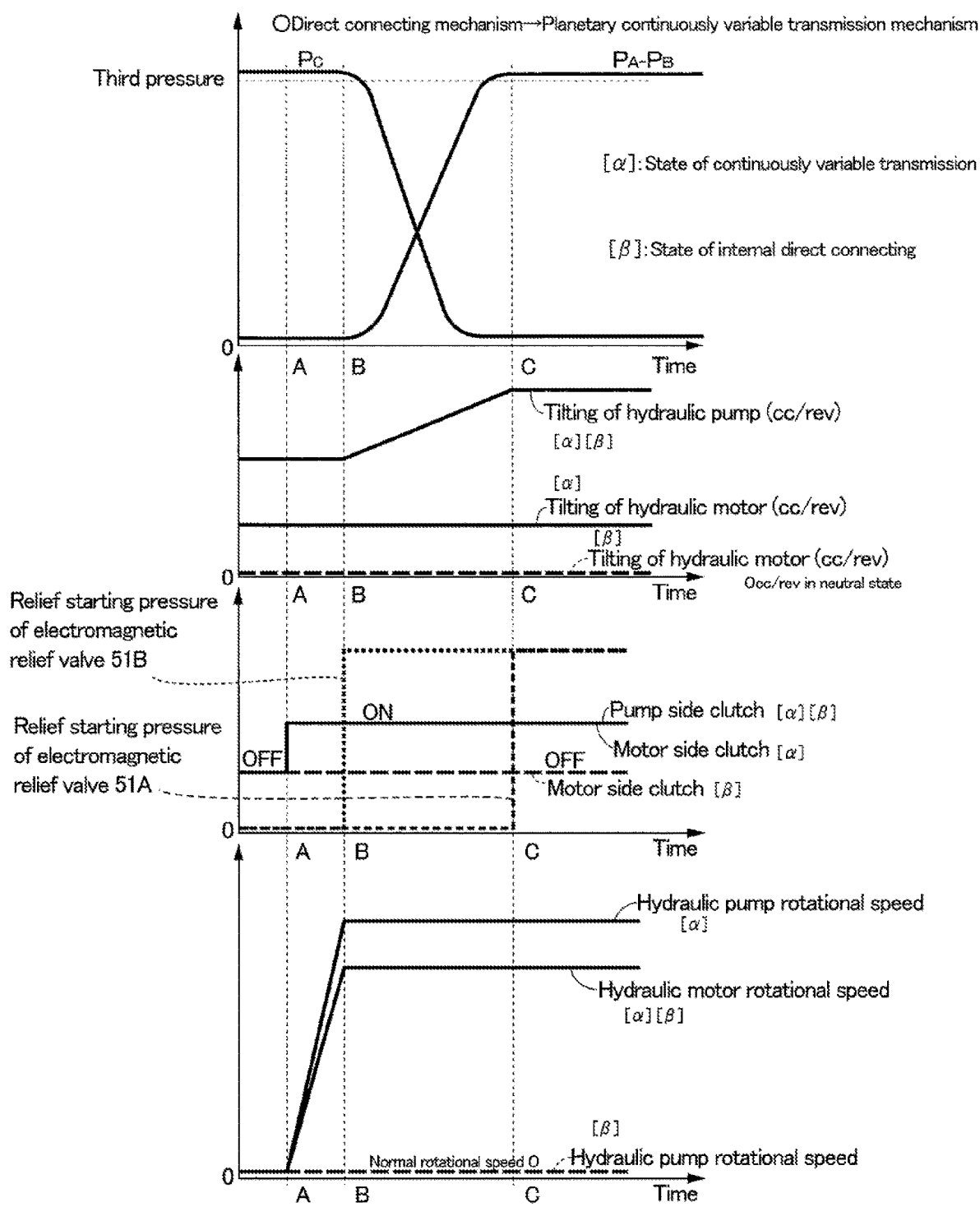
FIG. 12 is a time chart when the power is switched from the direct connecting mechanism to the planetary continuously variable transmission mechanism according to the first variant.

FIG. 12 shows a time chart of switching the power transmission path from the direct connecting mechanism 27 to the planetary continuously variable transmission mechanism 31 in the continuously variable transmission in the first variant. In a case where the power transmission path is the direct connecting mechanism 27, the wheel loader 1 is in a high-speed range. The controller 43 sets the pump side clutch 33 and the motor side clutch 40 at the "OFF (release) ", the direct connecting clutch 30 at the "ON (connection)", and maintains low relief starting pressures of the electromagnetic relief valve 51A and the electromagnetic relief valve 51B. If the processing in FIG. 6 proceeds to S14, the controller 43 outputs an ON command (connection command) from the clutch command part 43F to the pump side clutch 33 and the motor side clutch 40. As a result, connection to the pump side clutch 33 and the motor side clutch 40 will start (time point A). A command raising the relief starting pressure is outputted to the electromagnetic relief valve 51B from the electromagnetic relief valve command part (not shown) outputting an OFF command (release command) from the clutch command part 43F to the direct connecting clutch 30 and outputting a control command of relief starting pressures to the electromagnetic relief valve 51A and the electromagnetic relief valve 51B (time point B) when the connection of the pump side clutch 33 and the motor side clutch 40 is completed. As a result, the relief starting pressure of the electromagnetic relief valve 51B increases (time point B). Thereafter, the clutch pressure $P_C$ decreases, the direct connecting clutch 30 starts release, and the pressure difference $(P_B-P_A)$ between the main line 37A and the main line 37B increases. Thereafter, the controller 43 outputs a command increasing the relief starting pressure from the electromagnetic relief valve command part to the electromagnetic relief valve 51A when the pressure difference $(P_B-P_A)$ between the main line 37A and the main line 37B is a third pressure threshold value or more (time point C). As a result, the power transmission path is completely switched from the direct connecting mechanism 27 to the planetary continuously variable transmission mechanism 31.

Since relief starting pressures of the electromagnetic relief valve 51A and the electromagnetic relief valve 51B are held low during the period from the time point 0 to the time point B shown in FIG. 12, the flow of a hydraulic fluid traveling from the main line 37A toward the main line 37B through the connecting line 42 and the flow of a hydraulic fluid traveling from the main line 37B toward the main line 37A are in the communication state in both directions. Therefore, the power transmission is cut off in both directions of the hydraulic pump 36 and the hydraulic motor 38. On the other hand, a relief starting pressure of the electromagnetic relief valve 51A is held low and a relief starting pressure of the electromagnetic relief valve 51B is held high during the period from the time point B to the time point C. That is, the flow of hydraulic fluid traveling from the main line 37A toward the main line 37B through the connecting line 42 is communicated, while the flow of hydraulic fluid traveling from the main line 37B to the main line 37A is in a blocking state. Therefore, the power can be transmitted from the hydraulic pump 36 to the hydraulic motor 38, while the power transmission from the hydraulic motor 38 to the hydraulic pump 36 is cut off. On the other hand, since relief starting pressures of both the electromagnetic relief valve 51A and the electromagnetic relief valve 51B are held high during the period after the time point C, the flow of a hydraulic fluid traveling through the connecting line 42 from the main line 37A toward the main line 37B and the flow of a hydraulic fluid traveling from the main line 37B toward the main line 37A are both in the blocking state. Therefore, the power is capable of transmitting in both directions of the hydraulic pump 36 and the hydraulic motor 38.

Since this type of control allows the main line 37A and the main line 37B to be in the communicating state in both directions through the connecting line 42 during the period from the time point 0 to the time point B, the power transmission in both directions of the hydraulic pump 36 and the hydraulic motor 38 is cut off. Therefore, the pump side clutch 33 and the motor side clutch 40 can stably be connected in the state of cutting off power transmission by hydraulic power in the hydraulic circuit of the planetary continuously variable transmission mechanism 31 (hydrostatic continuously variable transmission mechanism 34).

On the other hand, the power is capable of transmitting from the hydraulic pump 36 to the hydraulic motor 38 during the period from the time point B to the time point C, while the power transmission from the hydraulic motor 38 to the hydraulic pump 36 is cut off. Therefore, the power transmitted from the input shaft 22 to the planetary continuously variable transmission mechanism 31 can be transmitted to the idler gear 29, but the power cannot be transmitted from the idler gear 29 to the input shaft 22 through the planetary continuously variable transmission mechanism 31. Since the direct connecting clutch 30 is provided with the clutch pressure $P_C$ during the period until the time point C, the power transmitted to the input shaft 22 can be transmitted to the idler gear 29 via the direct connecting mechanism 27. As a result, a "state of allowing the power transmitted to the input shaft 22 to be transmitted to the idler gear 29 via the direct connecting mechanism 27", a "state of allowing the power transmitted to the input shaft 22 to be transmitted to the to be transmitted to idler gear 29 via the planetary continuously variable transmission mechanism 31", a "state of allowing the power transmitted to the input shaft 22 to be transmitted to the idler gear 29 via the direct connecting mechanism 27 and cutting off power transmission to the input shaft 22 through the planetary continuously variable transmission mechanism 31" can simultaneously be prepared. Therefore, since a "power circulation state of transmitting the power transmitted to the input shaft 22 to the idler gear 29 via the direct connecting mechanism 27 and transmitting the power to the input shaft 22 through the planetary continuously variable transmission mechanism 31" is not provided, the power transmission path can readily be switched from the direct connecting mechanism 27 to the planetary continuously variable transmission mechanism 31.

This type of control allows for power transmission after the time point C in both directions of the hydraulic pump 36 and the hydraulic motor 38, thereby achieving power transmission through the planetary continuously variable transmission mechanism 31 and the idler gear 29 between the input shaft 22 and the output shaft 23. As a result, the power transmitted from the engine 9 to the input shaft 22 is transmitted to the front wheel 2 and the rear wheel 4 via the output shaft 23, the front axle 12 and the rear axle 13. Input forces from the front wheel 2 and the rear wheel 4 can be transmitted from the input shaft 22 to the engine 9 through the front axle 12, the rear axle 13 and the output shaft 23. That is, the transmission 21 can transmit the power in both cases where the power outputted from the engine 9 is transmitted to the front wheel 2 and the rear wheel 4 to accelerate the wheel loader 1 and where forces transmitted from the front wheel 2 and the rear wheel 4 are transmitted to the engine 9 to decelerate the wheel loader 1 to allow the engine 9 to absorb the power (engine brake). Therefore, this allows the engine 9 to not only accelerate but also decelerate (engine brake) the wheel loader 1, and reduce the load on a braking device (not shown) mounted in the front axle 12 and the rear axle 13.

The control of relief starting pressures of the electromagnetic relief valve 51A and the electromagnetic relief valve 51B during the period from the time point 0 to the time point C can readily switch the power transmission path from the direct connecting mechanism 27 to the planetary continuously variable transmission mechanism 31 while reducing torque variations.

As described above, the case where the power transmission path is switched from the direct connecting mechanism 27 to the state of the planetary continuously variable transmission mechanism 31 in the continuously variable transmission has been illustrated. Relief starting pressures of the electromagnetic relief valve 51A and the electromagnetic relief valve 51B are controlled in a similar manner when the power transmission path is switched from the direct connecting mechanism 27 to the planetary continuously variable transmission mechanism 31 in the internal direct connection. The difference is that the motor side clutch 40 is OFF from the time point 0, the tilting of the hydraulic motor 38 is neutral, and the rotational speed of the hydraulic pump 36 is 0 (or nearly 0).

Figure 13:
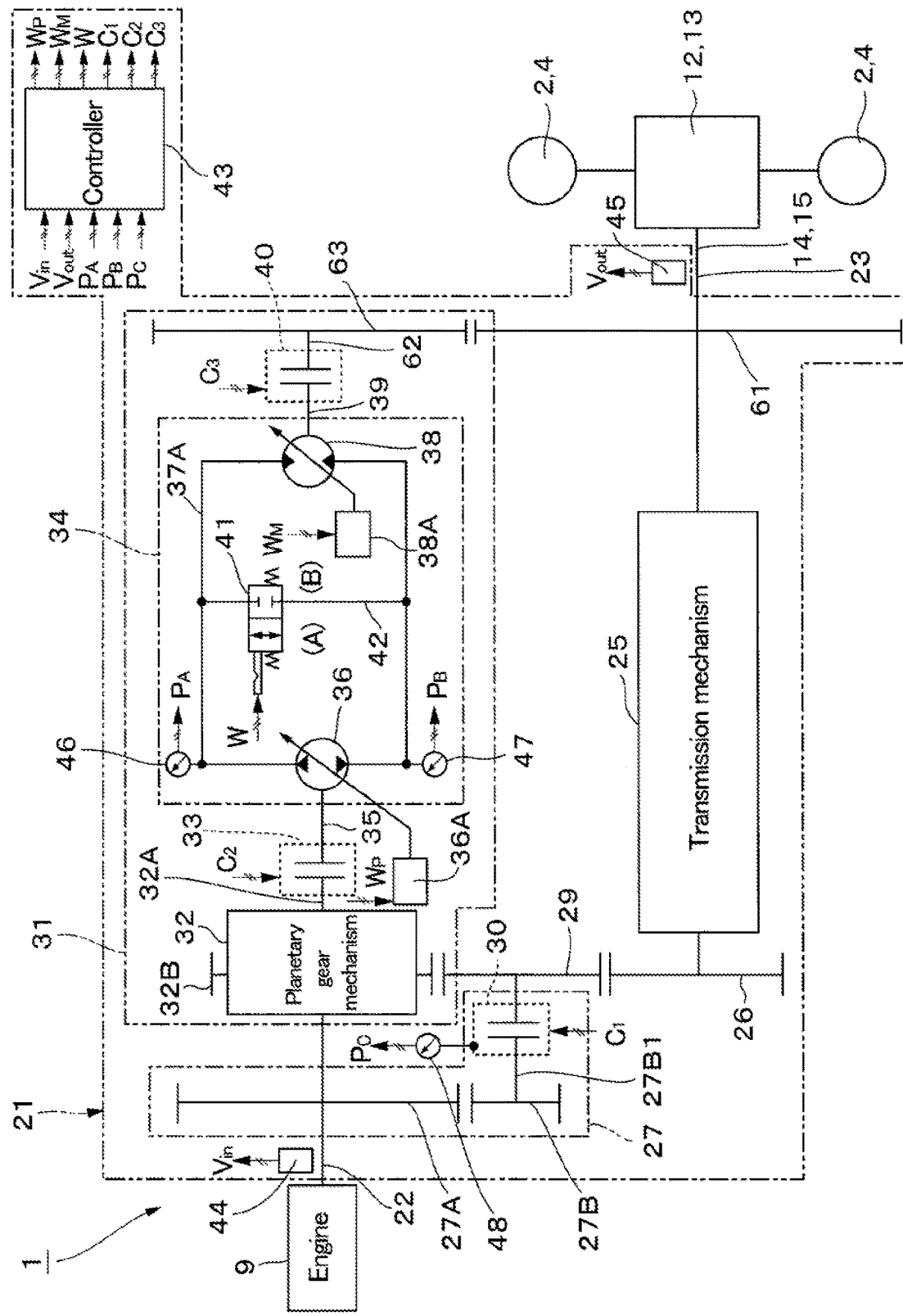
FIG. 13 is a configuration diagram showing the power transmission paths of a wheel loader on which a power transmission device for a vehicle is mounted according to a second variant together with a controller.

In the above-described embodiment, the case where a motor side clutch 40 as a third clutch is provided between a hydraulic motor 38 of a planetary continuously variable transmission mechanism 31 and an idler gear 29 has been illustrated. However, not limited thereto, and for example, like a second variant shown in FIG. 13, a motor side clutch 40 may be provided between the hydraulic motor 38 of the planetary continuously variable transmission mechanism 31 and the output shaft 23. That is, the output shaft 23 to be connected to the output side of the transmission mechanism 25 is provided with an output shaft gear 61. The output shaft side transmission shaft 62 is provided with a transmission gear 63 directly meshing with the output shaft gear 61 of the output shaft 23 or via a plurality of gears (not shown).

The motor side clutch 40 is disposed between the motor shaft 39 of the hydrostatic continuously variable transmission mechanism 34 and the output shaft side transmission shaft 62. The motor side clutch 40 is capable of switching between a "connecting state (fastening state)" of transmitting the rotation between the output shaft 23 and the hydrostatic continuously variable transmission mechanism 34 (the motor shaft 39 of the hydraulic motor 38) and a "blocking state (releasing state)" of disconnecting the transmission of rotation. In a case where the motor side clutch 40 is in the connecting state, the rotation of the motor shaft 39 of the hydrostatic continuously variable transmission mechanism 34 (=rotation of the hydraulic motor 38) is transmitted to the output shaft 23 via the output shaft side transmission shaft 62, the transmission gear 63, and the output shaft gear 61. In a case where the motor side clutch 40 is in the releasing state, the rotation of the motor shaft 39 is not transmitted to the output shaft side transmission shaft 62. According to this second variant, the transmission mechanism 25 can be configured in small size.

The embodiments are explained by taking the case where a transmission 21 as a power transmission device for a vehicle is mounted on a wheel loader 1 as a working vehicle as an example. However, not limited thereto, and for example, such a transmission can widely be used as power transmission devices for construction vehicles like wheel-type excavators, transport vehicles like lift trucks, farm vehicles like tractors and the like.

DESCRIPTION OF REFERENCE NUMERALS

1: Wheel loader (Vehicle)
9: Engine (Prime mover)
12: Front axle (Traveling device)
13: Rear axle (Traveling device)
21: Transmission (Power transmission device for a vehicle)
22: Input shaft
23, 23A, 23B: Output shaft
27: Direct connecting mechanism
29: Idler gear (Idler element)
30: Direct connecting clutch (First clutch)
31: Planetary continuously variable transmission mechanism
32: Planetary gear mechanism
33: Pump side clutch (Second clutch)
36: Hydraulic pump
37A, 37B: Main line
38: Hydraulic motor
40: Motor side clutch (Third clutch)

41: Electromagnetic on-off valve (Communication valve)
43: Controller
46: First pressure detector (Pressure detector)
47: Second pressure detector (Pressure detector)
51: Electromagnetic relief valve (Communication valve)

The invention claimed is:

1. A power transmission device for a vehicle, comprising:
an input shaft rotated by a prime mover mounted on the vehicle;
an output shaft outputting rotation to a traveling device of the vehicle;
a planetary continuously variable transmission mechanism disposed between the input shaft and the output shaft, and changing speed of a rotation on an input shaft side and transmitting power to an output shaft side;
a direct connecting mechanism transmitting the rotation on the input shaft side to the output shaft side by bypassing the planetary continuously variable transmission mechanism; and
an idler element mechanically connecting an output side of the planetary continuously variable transmission mechanism and an output side of the direct connecting mechanism, wherein
the direct connecting mechanism is provided with a first clutch disposed between the input shaft and the idler element, and
the planetary continuously variable transmission mechanism comprises:
a planetary gear mechanism connected to the input shaft side;
a second clutch disposed on an output side of the planetary gear mechanism;
a hydraulic pump connected to the output side of the planetary gear mechanism via the second clutch;
a hydraulic motor connected to the hydraulic pump via a pair of main lines;
a third clutch disposed between the hydraulic motor and the idler element or the output shaft; and
a communication valve capable of switching between a communicating state and a blocking state between the pair of main lines.

2. The power transmission device for the vehicle according to claim 1, wherein
the second clutch and the third clutch are each a synchromesh mechanism clutch.

3. The power transmission device for the vehicle according to claim 1, comprising
a controller controlling communication and blockade of the communication valve, and connection and release of the first clutch, the second clutch and the third clutch, wherein
when the controller is switched from a first state of transmitting the rotation of the input shaft to the output shaft via the planetary continuously variable transmission mechanism by releasing the first clutch and connecting both the second clutch and the third clutch to a second state of transmitting the rotation of the input shaft to the output shaft by bypassing the planetary continuously variable transmission mechanism by connecting the first clutch and releasing both the second clutch and the third clutch,
the controller releases the second clutch after switching the communication valve from the blocking state to the communicating state.

4. The power transmission device for the vehicle according to claim 3, wherein
said controller allows the three clutches of the first clutch, the second clutch and the third clutch to be in a connected state when the controller is switched from the first state to the second state.

5. The power transmission device for the vehicle according to claim 1, comprising
a controller controlling communication and blockade of the communication valve, and connection and release of the first clutch, the second clutch and the third clutch, wherein
when the controller is switched from a second state of transmitting the rotation of the input shaft to the output shaft by bypassing the planetary continuously variable transmission mechanism by connecting the first clutch and releasing both the second clutch and the third clutch to a first state of transmitting the rotation of the input shaft to the output shaft via the planetary continuously variable transmission mechanism by releasing the first clutch and connecting both the second clutch and the third clutch,
the controller switches the communication valve from the communicating state to the blocking state after connecting the second clutch.

6. The power transmission device for the vehicle according to claim 5, wherein
the controller allows the three clutches of the first clutch, the second clutch and the third clutch to be in a connected state when the controller is switched from the second state to the first state.

7. The power transmission device for the vehicle according to claim 1, comprising
a pressure detector detecting a pressure difference between the pair of main lines and a controller switching the communication valve based upon a detection value of the pressure detector, wherein
the controller switches the communication valve from the blocking state to the communicating state when the detection value of the pressure detector is a threshold value or less.

8. The power transmission device for the vehicle according to claim 1, wherein
the communication valve is an electromagnetic on-off valve capable of switching between an open position corresponding to the communicating state and a closed position corresponding to the blocking state.

9. The power transmission device for the vehicle according to claim 1, wherein
the communication valve is an electromagnetic relief valve capable of changing a set value, which is increased to achieve the blocking state and decreased to achieve the communicating state.

10. The power transmission device for the vehicle according to claim 9, comprising
a controller changing the set value of the electromagnetic relief valve, and controlling connection and release of the first clutch, the second clutch and the third clutch, wherein
when the controller is switched from a first state of transmitting the rotation of the input shaft to the output shaft via the planetary continuously variable transmission mechanism by releasing the first clutch and connecting both the second clutch and the third clutch to a second state of transmitting the rotation of the input shaft to the output shaft by bypassing the planetary continuously variable transmission mechanism by connecting the first clutch and releasing both the second clutch and the third clutch, the controller provides the communicating state between the pair of main lines in one direction and the blocking state in the opposite direction.

11. The power transmission device for the vehicle according to claim 9, comprising a controller changing the set value of the electromagnetic relief valve, and controlling connection and release of the first clutch, said second clutch and said third clutch, wherein when the controller is switched from a second state of transmitting the rotation of the input shaft to the output shaft by bypassing said planetary continuously variable transmission mechanism by connecting the first clutch and releasing both the second clutch and the third clutch to a first state of transmitting the rotation of the input shaft to the output shaft via the planetary continuously variable transmission mechanism by releasing the first clutch and connecting both the second clutch and the third clutch, the controller provides the communicating state between the pair of main lines in one direction and the blocking state in the opposite direction.

\* \* \* \* \*